（12） United States Patent
Chidate

(10) Patent No.: US 12,115,791 B2
(45) Date of Patent: Oct. 15, 2024

(54) INK JET RECORDING APPARATUS AND MAINTENANCE METHOD

(71) Applicant: Seiko Epson Corporation, Tokyo (JP)

(72) Inventor: Kosuke Chidate, Shiojiri (JP)

(73) Assignee: SEIKO EPSON CORPORATION

( * ) Notice: Subject to any disclaimer, the term of this patent is extended or adjusted under 35 U.S.C. 154(b) by 193 days.

(21) Appl. No.: 17/460,442

(22) Filed: Aug. 30, 2021

(65) Prior Publication Data

US 2022/0063276 A1   Mar. 3, 2022

(30) Foreign Application Priority Data

Aug. 31, 2020   (JP) .................................. 2020-145441

(51) Int. Cl.
*B41J 2/165*   (2006.01)
*C09D 11/322*   (2014.01)

(52) U.S. Cl.
CPC ......... *B41J 2/1652* (2013.01); *B41J 2/16535* (2013.01); *C09D 11/322* (2013.01)

(58) Field of Classification Search
CPC ......... C09D 11/54; C09D 11/10; C09D 11/30; C09D 11/00; B41J 2/1655; B41J 2002/1655; B41J 2/01; B41J 2/175; B41J 2/2114; B41J 2002/16558; B41M 5/0017; B41M 7/0018
See application file for complete search history.

(56) References Cited

U.S. PATENT DOCUMENTS

| 2002/0043177 A1* | 4/2002 | Koitabashi | C09D 11/40 106/31.27 |
| 2004/0036200 A1* | 2/2004 | Patel | B33Y 10/00 700/118 |
| 2010/0238232 A1* | 9/2010 | Clarke | B01J 13/02 347/21 |
| 2011/0069114 A1* | 3/2011 | Ikoshi | B41J 2/16552 106/31.13 |
| 2012/0140005 A1* | 6/2012 | De Voeght | G01D 11/00 347/93 |
| 2013/0070036 A1* | 3/2013 | Ooishi | C09D 11/54 347/102 |

(Continued)

FOREIGN PATENT DOCUMENTS

| CN | 113370657 A | 9/2021 |
| JP | 2008-188858 A | 8/2008 |

(Continued)

*Primary Examiner* — John Zimmermann
(74) *Attorney, Agent, or Firm* — Harness, Dickey & Pierce, P.L.C.

(57) ABSTRACT

The ink jet recording apparatus according to the present application includes a recording head including a nozzle for discharging an ink composition and a nozzle-forming surface having a discharge opening of the nozzle, a cleaning mechanism performing cleaning operation by ejecting the ink composition from the nozzle, and a wiping cleaning mechanism of wiping the nozzle-forming surface with an absorption member containing cellulose. The ink composition contains a pigment, a crosslinkable component, a surfactant, and water and has a contact angle of 50° or more on the nozzle-forming surface. The cleaning mechanism performs pressurized cleaning by applying a pressure to the inside of the recording head.

7 Claims, 3 Drawing Sheets

(56) References Cited

U.S. PATENT DOCUMENTS

| | | | |
|---|---|---|---|
| 2013/0293644 A1* | 11/2013 | Anton | C09D 11/38 |
| | | | 347/100 |
| 2013/0300799 A1 | 11/2013 | Mizutani et al. | |
| 2014/0364548 A1* | 12/2014 | Everhardus | C09D 11/322 |
| | | | 524/265 |
| 2015/0085025 A1* | 3/2015 | Ando | B41J 2/18 |
| | | | 347/85 |
| 2015/0290941 A1 | 10/2015 | Mizutani | |
| 2017/0267879 A1* | 9/2017 | Kohzuki | C09D 11/107 |
| 2018/0086929 A1* | 3/2018 | Hayashi | D06P 1/647 |
| 2018/0362787 A1* | 12/2018 | Ozawa | C09D 11/38 |
| 2020/0164652 A1* | 5/2020 | Bannai | B41J 2/16535 |
| 2021/0283916 A1 | 9/2021 | Nakamura et al. | |

FOREIGN PATENT DOCUMENTS

| | | |
|---|---|---|
| JP | 2013-256102 A | 12/2013 |
| JP | 2016-112763 A | 6/2016 |
| JP | 2017-030276 A | 2/2017 |

\* cited by examiner

INK JET RECORDING APPARATUS AND MAINTENANCE METHOD

The present application is based on, and claims priority from JP Application Serial Number 2020-145441, filed Aug. 31, 2020, the disclosure of which is hereby incorporated by reference herein in its entirety.

BACKGROUND

1. Technical Field

The present disclosure relates to an ink jet recording apparatus and a maintenance method.

2. Related Art

Ink jet recording apparatuses are relatively simple apparatuses and can record high-resolution images and are being rapidly developed in various aspects. Among them, cleaning methods of ink jet recording apparatuses are being variously studied.

For example, JP-A-2008-188858 describes, as a method for cleaning the nozzle surface of a recording head, cleaning of a nozzle surface by removing droplets adhered to the nozzle surface through pressing of an absorption sheet to the nozzle surface.

However, in the cleaning method described in JP-A-2008-188858, when an ink composition containing a crosslinkable component for improving the friction fastness is used, the liquid repellent durability (nozzle durability) of the nozzle-forming surface of an ink jet head was decreased in some cases. Consequently, it is required to achieve both of provision of a recorded matter having excellent friction fastness and good liquid repellent durability (nozzle durability).

SUMMARY

An aspect of the ink jet recording apparatus according to the present disclosure is an ink jet recording apparatus that includes a recording head including a nozzle for discharging an ink composition and a nozzle-forming surface having a discharge opening of the nozzle, a cleaning mechanism performing cleaning operation by ejecting the ink composition from the nozzle, and a wiping cleaning mechanism of wiping the nozzle-forming surface with an absorption member containing cellulose, in which the ink composition contains a pigment, a crosslinkable component, a surfactant, and water, the ink composition has a contact angle of 500 or more on the nozzle-forming surface, and the cleaning mechanism performs pressurized cleaning by applying a pressure to the inside of the recording head.

An aspect of the maintenance method according to the present disclosure is a maintenance method for the ink jet recording apparatus of the aspect above that includes a cleaning step of performing the pressurized cleaning by applying a pressure to the inside of the recording head and ejecting the ink composition from the nozzle and a wiping cleaning step of wiping the nozzle-forming surface with the absorption member containing cellulose.

DESCRIPTION OF EXEMPLARY EMBODIMENTS

Figure 1:
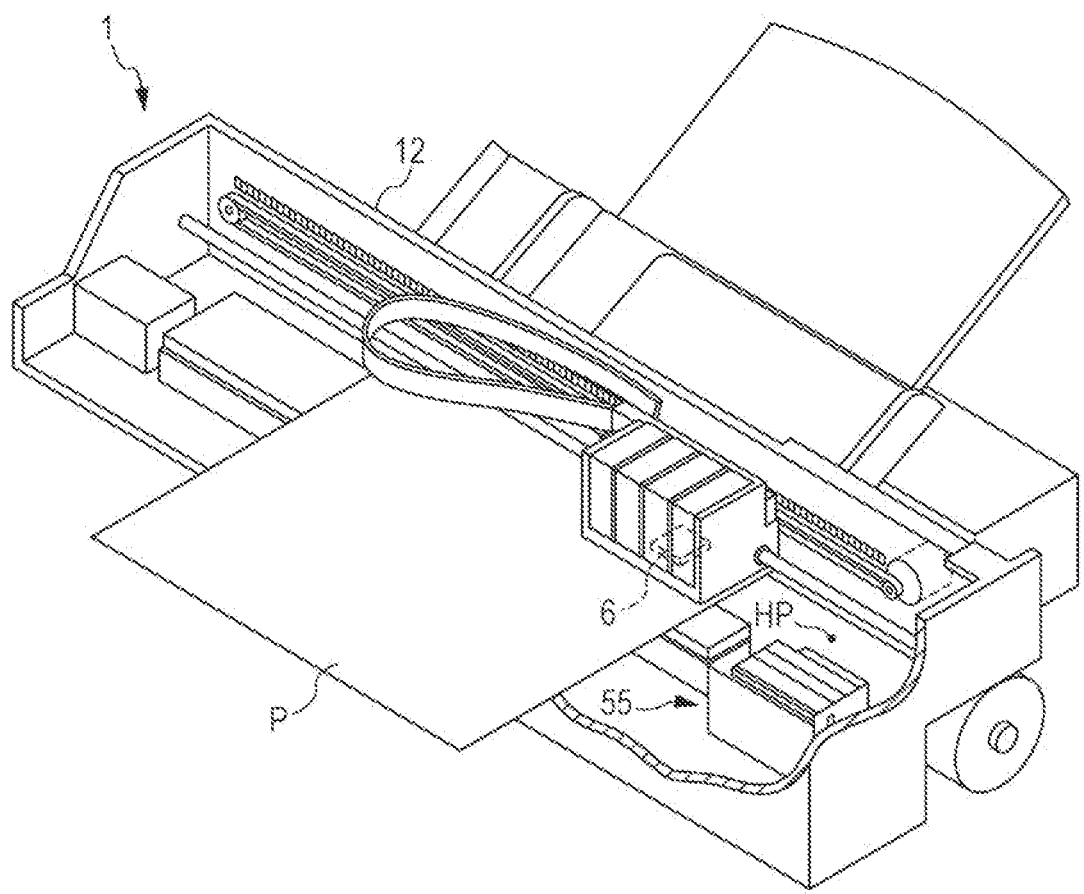
FIG. 1 is a diagram schematically illustrating an ink jet recording apparatus according to the present embodiment.

Embodiments of the present disclosure will now be described. The embodiments described later describe examples of the present disclosure. The present disclosure is not limited to the following embodiments and also encompasses various modifications that are implemented within a range not changing the gist of the present disclosure. Incidentally, not all of the configurations described later are essential configurations of the present disclosure.

1. Ink Jet Recording Apparatus

The ink jet recording apparatus according to an embodiment of the present disclosure includes a recording head including a nozzle for discharging an ink composition and a nozzle-forming surface having a discharge opening of the nozzle, a cleaning mechanism performing cleaning operation by ejecting the ink composition from the nozzle, and a wiping cleaning mechanism of wiping the nozzle-forming surface with an absorption member containing cellulose. The ink composition contains a pigment, a crosslinkable component, a surfactant, and water and has a contact angle of 500 or more on the nozzle-forming surface. The cleaning mechanism is a pressurized cleaning mechanism performing cleaning by applying a pressure to the inside of the recording head.

In an ink jet recording apparatus discharging an ink composition from a nozzle, from the viewpoint of ensuring stable discharge of the ink composition, the recording head is regularly cleaned. As such cleaning, there are a cleaning method by forcibly ejecting the ink composition in the nozzle and a wiping cleaning method by removing the ink droplets remaining on the nozzle-forming surface during the ejection through wiping of the nozzle-forming surface with an absorption member.

However, when the ink composition that is used in an ink jet recording apparatus contains a pigment and a resin and a crosslinkable component having a reactivity with an OH group of a recording medium for improving the friction fastness of a recorded matter, the durability of liquid repellency of the nozzle-forming surface is decreased by cleaning the recording head, and good discharge stability cannot be ensured in some cases.

It was demonstrated that such a decrease in the durability of liquid repellency of the nozzle-forming surface is caused by physical or chemical damage on the nozzle-forming surface when the ink composition as described above is used. That is, it is inferred that during the wiping cleaning by wiping the nozzle-forming surface with an absorption member, the pigment contained in the ink composition is rubbed against the nozzle-forming surface, resulting in damage of the nozzle-forming surface. It is also inferred that the nozzle-forming surface reacts with the crosslinkable component in the ink composition remaining on the nozzle-forming surface, resulting in a change in the chemical composition on the nozzle-forming surface.

Accordingly, in an ink composition containing a pigment and a crosslinkable component, an improvement in the friction fastness of a recorded matter and maintenance of durability of the liquid repellency of the nozzle-forming surface of the recording head are in a conflicting relationship, and it is a requirement to achieve both the friction fastness and the durability of liquid repellency.

Against this, in the ink jet recording apparatus according to the present embodiment, the contact angle of the ink composition on the nozzle-forming surface is regulated to a certain value or more, and the wiping cleaning is performed by wiping with an absorption member containing cellulose. Consequently, the physical damage on the nozzle-forming surface is reduced, and also ink droplets are unlikely to remain on the nozzle-forming surface. As a result, the chemical damage on the nozzle-forming surface due to the reaction of the crosslinkable component in ink droplets with the nozzle-forming surface can also be reduced. In addition, sudden ejection of the ink composition from the nozzle can be prevented and physical damage on the nozzle-forming surface can be further reduced by performing pressurized cleaning as the cleaning method by forcibly ejecting the ink composition in the nozzle. Consequently, even if the ink composition that is used in the ink jet recording apparatus contains a pigment and a crosslinkable component, the physical and chemical damages on the nozzle-forming surface during cleaning of the recording head are decreased, and both the friction fastness and the durability of liquid repellency can be achieved. Incidentally, in the present disclosure, the term "liquid repellency" refers to a large contact angle between a solid (nozzle-forming surface) and a liquid (ink composition) and a property or an ability of hardly getting wet.

An example of the configuration of the ink jet recording apparatus according to the present embodiment and the ink composition used in the ink jet recording apparatus according to the present embodiment (hereinafter, also simply referred to as "ink composition") will now be described in detail in turn.

1.1. Apparatus Configuration

FIG. 1 is a diagram schematically illustrating an ink jet recording apparatus according to the present embodiment. As shown in FIG. 1, the ink jet recording apparatus 1 includes a recording head 6 for discharging an ink composition, a maintenance unit 55, and a pressurized cleaning mechanism (not shown). That is, the ink jet recording apparatus 1 shown in FIG. 1 has a configuration in which the maintenance unit 55 and the pressurized cleaning mechanism have been incorporated into a known ink jet printer.

1.1.1. Recording Head

Figure 2:
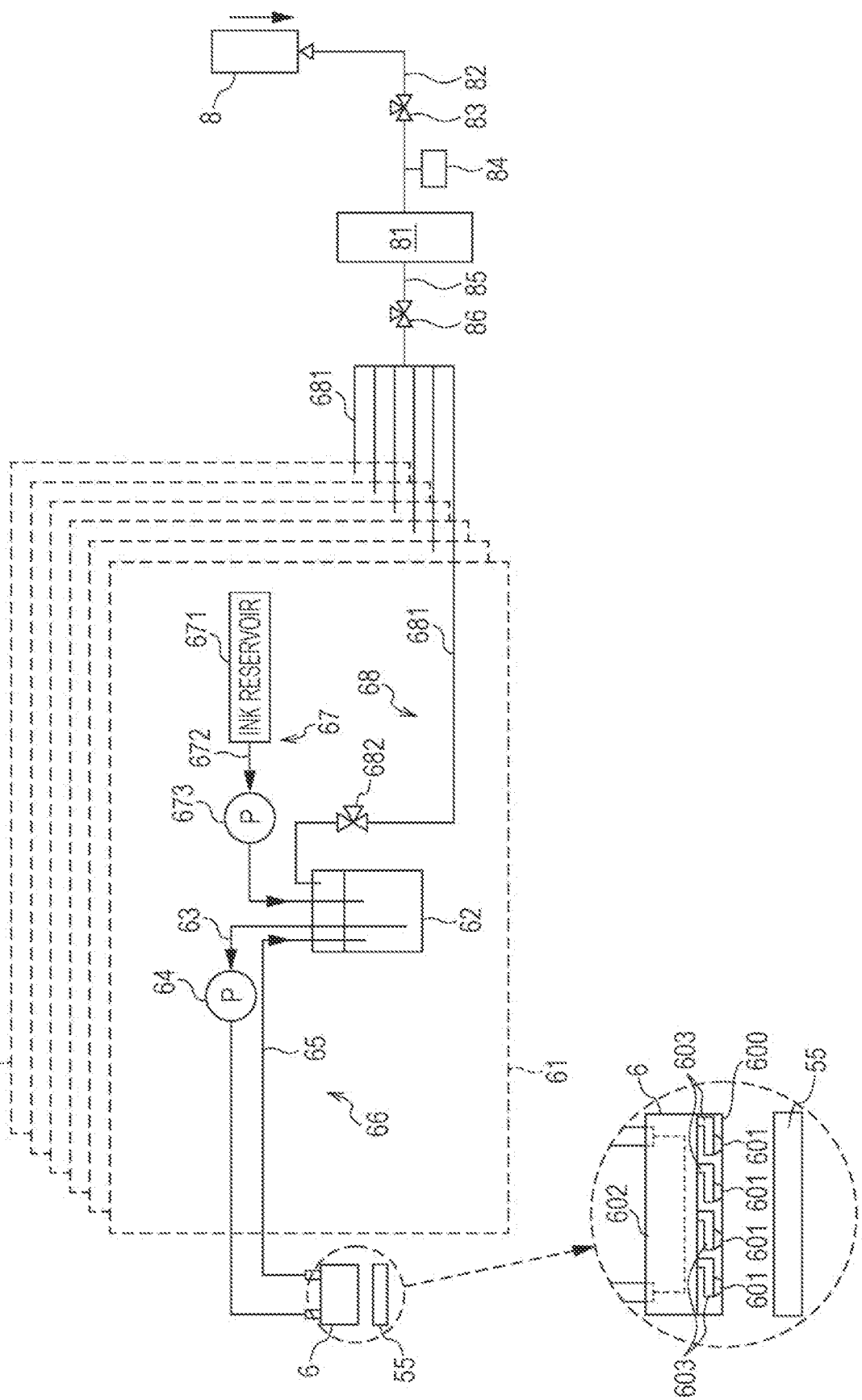
FIG. 2 is a diagram schematically illustrating a configuration example of a recording head, an ink feed mechanism, and a pressurized cleaning mechanism.

FIG. 2 is a diagram schematically illustrating a configuration example of a recording head 6 and an ink feed unit 61 that feeds an ink composition (described later) to the recording head 6. As shown in FIG. 2, the recording head 6 includes nozzles 601 that discharge the ink composition and a nozzle-forming surface 600 having discharge openings 606 (not shown) of the nozzles.

The recording head 6 includes the nozzles 601 opening in the nozzle-forming surface 600, a reservoir 602 temporarily storing the ink composition, and cavities 603 communicating between the nozzles 601 and the reservoir 602, and the ink composition is supplied to the nozzles 601 from the reservoir 602 through the cavities 603. At the time of recording, the cavity 603 applies a pressure to the ink composition, and the ink composition is jetted from the nozzle 601.

The ink feed unit 61 is provided for each recording head 6 and feeds the ink composition to the recording head 6. As one example, these ink feed units 61 each include a tank 62 for storing an ink composition, a feed channel 63 coupling between the tank 62 and the reservoir 602 of the recording head 6, a liquid transfer pump 64 disposed in the feed channel 63, and a collection channel 65 coupling between the reservoir 602 of the recording head 6 and the tank 62. Thus, a circulation path 66 in which the ink composition flows in the tank 62, the feed channel 63, the reservoir 602 of the recording head 6, the collection channel 65, and the tank 62 in this order is formed. Accordingly, the ink composition circulates in the circulation path 66 by rotating the liquid transfer pump 64 in the forward direction. That is, the ink composition that is stored in the tank 62 is fed to the recording head 6 through the feed channel 63 (outward route) by the liquid transfer pump 64 and is collected from the recording head 6 to the tank 62 through the collection channel 65 (homeward route).

The ink feed unit 61 includes an ink supply mechanism 67 supplying the ink composition to the tank 62 and a pressure control mechanism 68 adjusting the pressure in the tank 62. The ink supply mechanism 67 includes an exchangeable or refillable ink reservoir 671, such as an ink cartridge or an ink pack, a supply channel 672 (supply tube) coupling between the ink reservoir 671 and the tank 62, and a supply pump 673 disposed in the supply channel 672. The ink composition in the ink reservoir 671 is supplied to the tank 62 through the supply channel 672 by rotating the supply pump 673 in the forward direction.

Examples of the recording head 6 include a line head performing recording by a line system and a serial head performing recording by a serial system.

In the line system using a line head, for example, an ink jet head having a width not smaller than the recording width of the recording medium is fixed to the recording apparatus. The recording medium is moved along the sub-scanning direction (the vertical direction of the recording medium, the transporting direction), and ink droplets are discharged from the nozzles of the ink jet head in conjunction with this movement. Consequently, an image can be recorded on the recording medium.

In the serial system using a serial head, for example, an ink jet head is mounted on a carriage that can move in the width direction of the recording medium. The carriage is moved along the main scanning direction (the horizontal direction of the recording medium, the width direction), and ink droplets are discharged from the nozzle of the ink jet head in conjunction with this movement. Consequently, an image can be recorded on the recording medium.

1.1.2. Nozzle-Forming Surface

Figure 3:
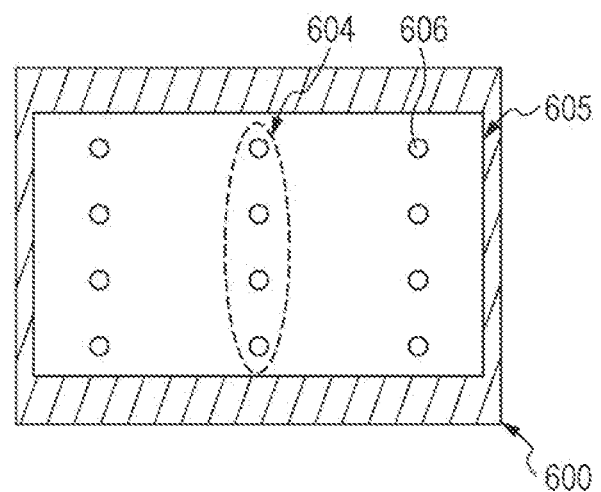
FIG. 3 is a schematic diagram schematically illustrating the nozzle-forming surface of an ink jet recording apparatus according to the present embodiment.

FIG. 3 is a schematic diagram schematically illustrating the nozzle-forming surface 600 viewed from the recording medium P side of the recording head 6. As shown in FIG. 3, the nozzle-forming surface 600 is provided with a plurality of discharge openings 606 of nozzles for discharging the ink composition. A plurality of the discharge openings 606 aligned in a predetermined direction constitutes a nozzle line 604. As shown in FIG. 3, the nozzle-forming surface 600 is provided with a plurality of nozzle lines 604.

The nozzle-forming surface 600 may have a fluorine compound bound through a hydrolyzable bond. Consequently, the liquid repellency of the nozzle-forming surface 600 can be further improved, the contact angle of the ink composition described later on the nozzle-forming surface 600 can be easily adjusted within a range of a certain level or more, and good discharge stability tends to be obtained. On the other hand, if the nozzle-forming surface 600 has a fluorine compound bound through a hydrolyzable bond, the fluorine compound may react with the crosslinkable component contained in the ink composition when the hydrolysable bond is cleaved by hydrolysis. Such a reaction causes a change in the chemical composition on the nozzle-forming surface 600 and thereby may affect the liquid repellent durability and the discharge stability. However, in the ink jet recording apparatus according to the present embodiment, the contact angle of the ink composition on the nozzle-forming surface is regulated to a certain level or more, the wiping cleaning is performed by wiping with an absorption member containing cellulose, and also pressurized cleaning is performed. Consequently, the liquid repellent durability and the discharge stability can be ensured.

In the present disclosure, the phrase "fluorine compound bound through a hydrolyzable bond" refers to a compound having a long-chain polymer group containing fluorine binding to the surface of the nozzle-forming surface 600 by a bond that can receive hydrolysis. Such a hydrolyzable bond is formed by, for example, the dehydrative condensation reaction between a compound including a hydroxy group directly bonding to a metal atom generated by hydrolysis of the alkoxy group of a metal alkoxide and a hydroxyl group present on the surface of the nozzle-forming surface 600. Specifically, when the metal alkoxide is a silane coupling agent or the like, the alkoxy group on a silicon atom is hydrolyzed to generate silanol (Si—OH), which is formed into a hydrolyzable bond (Si—O bond) through dehydrative condensation reaction with the hydroxyl group present on the surface of the nozzle-forming surface 600.

Examples of the method for imparting a "fluorine compound bound through a hydrolyzable bond" to the nozzle-forming surface 600 include a method of forming a molecular film of a metal alkoxide having a long-chain polymer group containing fluorine and then performing drying treatment, anneal treatment, etc. The film thus formed on the nozzle-forming surface 600 by the fluorine compound bound through a hydrolyzable bond is also referred to as a liquid repellent film below.

The metal alkoxide is not particularly limited, and as the metal species, for example, silicon, titanium, aluminum, and zirconium are usually used. Examples of the long-chain polymer group containing fluorine include a perfluoroalkyl chain and a perfluoropolyether chain. Examples of the alkoxysilane having such a long-chain polymer group containing fluorine include a silane coupling agent having a long-chain polymer group containing fluorine. The liquid repellent film is not particularly limited, and, for example, an SCA (silane coupling agent) film or that described in Japanese Patent No. 4424954 can be used.

In addition, the liquid repellent film may be formed on a conductive film that has been formed on a substrate (nozzle plate) provided with a nozzle or may be formed on a base film (PPSi (plasma polymerization silicone) film) that has been previously formed by plasma polymerization of a silicon material. The silicon material of the nozzle plate and the liquid repellent film are conformed to each other through this base film.

The thickness of the liquid repellent film may be 1 nm or more and 30 nm or less, 1 nm or more and 20 nm or less, or 1 nm or more and 15 nm or less. When the thickness of the liquid repellent film is within the above-mentioned range, the nozzle-forming surface 600 tends to have more excellent liquid repellency, deterioration of the film is relatively slow, and the liquid repellency can be maintained for a longer period of time. In addition, it is also more excellent in cost performance and ease of film formation.

The nozzle-forming surface 600 may be provided with a nozzle plate cover 605 that covers at least a part of the nozzle-forming surface 600. In an example of FIG. 3, the nozzle plate cover 605 is provided so as to surround the whole nozzle lines 604 (discharge openings 606). In the nozzle-forming surface 600 of a head that is formed by combination of a plurality of nozzle chips (hereinafter, simply referred to as "chips"), the nozzle plate cover 605 is provided so as to play at least one of the role of fixing the chips and the role of preventing the recording medium from rising and coming into direct contact with the nozzles.

1.1.3. Pressurized Cleaning

The ink jet recording apparatus according to the present embodiment includes a pressurized cleaning mechanism that performs cleaning by applying a pressure to the inside of the recording head 6 as a cleaning mechanism that performs cleaning operation by ejecting the ink composition from the nozzles 601. The pressurized cleaning is a cleaning method by continuously ejecting an ink composition from the nozzles 601 by increasing the pressure in the tank 62 for supplying the ink composition to the recording head 6 that discharges the ink composition. In contrast, ejection of an ink composition by so-called flushing (idly jetting) is a method for intermittently ejecting an ink composition from the nozzles 601 by applying a drive signal unrelated to the recording to a piezoelectric element in the recording head 6 to apply a pressure to a cavity 603 through deformation of the piezoelectric element. Accordingly, in the pressurized cleaning, it is possible to keep the applied pressure constant, and cleaning by ejecting the ink composition continuously and in a large amount.

In addition, the pressurized cleaning can further reduce the physical damage on the nozzle-forming surface 600 compared to reduced pressure cleaning. The reduced pressure cleaning is a cleaning method for ejecting an ink composition from the nozzle 601 by covering the nozzle-forming surface 600 with a cap, generating a negative pressure by a suction pump or a negative pressure generating mechanism, and then opening the valve to reduce the pressure of the covered space. In such reduced pressure cleaning, in particular, the pressure in the space largely changes immediately after opening of the valve to suddenly eject the ink composition. In contrast, in pressurized cleaning, the applied pressure in the tank 62 is easily kept to a certain level or less, sudden ejection of the ink composition hardly occurs. Thus, the physical damage on the nozzle-forming surface 600 can be further reduced by performing cleaning by pressurized cleaning, the liquid repellent durability of the nozzle-forming surface 600 is further improved, and the discharge stability can be further improved.

As shown in FIG. 2, the pressure control mechanism 68 includes a pressurization path (pressurizing piping) 681 coupling between a pressurized buffer tank 81 described later and the tank 62 and a three-way valve 682 disposed in the pressurization path 681. The pressure in the tank 62 is adjusted by operating the three-way valve 682. That is, the three-way valve 682 has a function of switching between the path from the pressurized buffer tank 81 described later to the tank 62 and the path for introducing the air to the tank 62 and allows to select either of the paths. For example, when the path is switched to that from the pressurized buffer tank 81 to the tank 62, the positive pressure accumulated in the pressurized buffer tank 81 is given to the tank 62 to increase the pressure in the tank 62. Conversely, when the path is switched to that for introducing the air to the tank 62, the inside of the tank 62 is opened to the atmosphere, and the pressure returns to the atmospheric pressure.

When the positive pressure accumulated in the pressurized buffer tank 81 is given to the tank 62 to increase the pressure in the tank 62, the pressure (applied pressure) in the tank 62 may be 38 kPa or less, 37 kPa or less, or 36 kPa or less. When the pressure (applied pressure) in the tank 62 is within the above-mentioned range or less, sudden ejection of the ink composition is prevented, and physical damage on the nozzle-forming surface 600 is further reduced. Accordingly, the liquid repellent durability of the nozzle-forming surface 600 is further improved, and the discharge stability can be further improved.

The pressurized buffer tank 81 has, for example, a columnar shape and can accumulate positive pressure in the space thereof. The pressurized buffer tank 81 is coupled to a pressurizing pump 8 by a positive pressure introducing path (piping) 82. In addition, the positive pressure introducing path 82 is provided with a three-way valve 83. The three-way valve 83 has a function of switching between the path from the pressurized buffer tank 81 to the pressurizing pump 8 and the path for introducing the air to the pressurizing pump 8 and allows to select either of the paths. For example, when the path is switched to that from the pressurized buffer tank 81 to the pressurizing pump 8, a pressure is applied to the pressurized buffer tank 81 by the pressurizing pump 8 to increase the pressure in the space thereof. When the pressurizing pump 8 is continuously operated to continue the pressure application, positive pressure is stored in the pressurized buffer tank 81, and the stored positive pressure is accumulated. In contrast, when the path is switched to that for introducing the air to the pressurizing pump 8, the pressure application by the pressurizing pump 8 to the pressurized buffer tank 81 is stopped. Incidentally, a pressure sensor 84 is provided for measuring the pressure in the pressurized buffer tank 81.

The pressurized buffer tank 81 is coupled to one end of a common pressurization path (piping) 85. The other end of the common pressurization path 85 diverges into six paths, and each divergent path functions as a pressurization path 681. Furthermore, the common pressurization path 85 is provided with a three-way valve 86, which has a function of switching between the path from the pressurized buffer tank 81 to each ink feed unit 61 and the path for releasing the pressure form the pressurized buffer tank 81 to the atmosphere and allows to select either of the paths. For example, when the path is switched to that from the pressurized buffer tank 81 to each ink feed unit 61, each part of each ink feed unit 61 is pressurized by the positive pressure in the pressurized buffer tank 81. On contrast, when the path is switched to that for releasing the air from the pressurized buffer tank 81 to the atmosphere, the pressure supply by the positive pressure in the pressurized buffer tank 81 to each ink feed unit 61 is stopped.

1.1.4. Wiping Cleaning Mechanism

The ink jet recording apparatus according to the present embodiment includes a wiping cleaning mechanism of wiping the nozzle-forming surface 600 with an absorption member containing cellulose. The wiping cleaning mechanism moves at least one of an absorption member 701 and a recording head 6 relatively to the other to remove ink droplets adhered to the nozzle-forming surface 600 by the absorption member 701. That is, the ink composition discharged from the discharge opening 606 of a nozzle by pressurized cleaning or recording operation and adhered to the nozzle-forming surface 600 is wiped away by the absorption member 701. Consequently, the amount of the ink composition remaining on the nozzle-forming surface 600 can be decreased, and thereby the chemical damage on the nozzle-forming surface 600 caused by the crosslinkable component contained in the ink composition can be reduced. Accordingly, the liquid repellent durability of the nozzle-forming surface 600 is further improved by performing wiping cleaning, and the discharge stability can be further improved.

Figure 4:
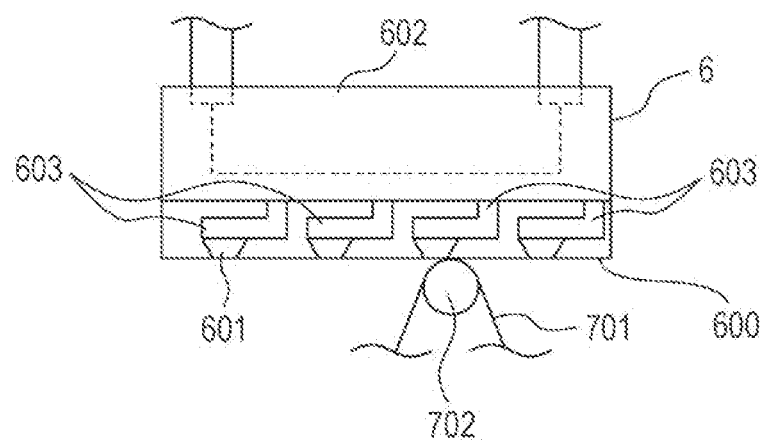
FIG. 4 is a diagram schematically illustrating a configuration example of a wiping cleaning mechanism.

FIG. 4 schematically shows a wiping cleaning mechanism as an example of the maintenance unit 55. The wiping cleaning mechanism includes an absorption member 701 and a driving mechanism 702 for moving the absorption member 701 along the nozzle-forming surface 600 and includes a washing liquid supply tube (not shown) that jets a washing liquid as needed.

The absorption member 701 is not particularly limited as long as it has liquid absorbency, and examples thereof include cloth (such as woven fabric, knitted, and non-woven fabric), sponge, and pulp. Among them, the absorption member 701 may be cloth, because cloth is easily bent and is easier to wipe off the ink adhered to the nozzle-forming surface 600, in particular, when a nozzle plate cover 605 is provided. In addition, the absorption member 701 that is used in the present embodiment is formed of fibers containing cellulose. Furthermore, the absorption member 701 may be formed of fibers consisting of cellulose. Physical damage on the nozzle-forming surface 600 can be reduced by using such an absorption member 701 compared to the case of wiping with a rubber wiper or the like. Accordingly, even in the ink jet recording apparatus according to the present embodiment using an ink composition containing a pigment, the liquid repellent durability of the nozzle-forming surface 600 is prevented from decreasing, and discharge stability can be ensured.

The thickness of the absorption member 701 can be appropriately set according to the demand and can be, for example, 0.1 mm or more and 3 mm or less. When the thickness is 0.1 mm or more, it is possible to increase the amount of the ink composition to be absorbed and to further decrease the amount of the ink composition remaining on the nozzle-forming surface 600. When the thickness is 3 mm or less, the absorption member 701 becomes compact, the size of the whole of the maintenance unit 55 can be reduced, and the mechanical transport of the absorption member 701 is also easier.

The area density of the absorption member 701 may be 0.005 $g/cm^2$ or more and 0.15 $g/cm^2$ or less or 0.02 $g/cm^2$ or more and 0.13 $g/cm^2$ or less. In this range, the ink composition remaining on the nozzle-forming surface 600 is more easily absorbed.

The absorption member 701 may hold an impregnation liquid described later at the time of shipment. Consequently, it is possible to immediately wipe the nozzle-forming surface 600, and it is not necessary to provide a mechanism for jetting or applying the impregnation liquid to the nozzle-forming surface 600. Here, the phrase "holding a impregnation liquid at the time of shipment" refers to a state in which the absorption member 701 already holds an impregnation liquid when an ink jet recording apparatus equipped with the absorption member 701 is installed, a state in which the absorption member 701 already holds an impregnation liquid when an absorption member 701 is installed to an ink jet recording apparatus, or a state in which an absorption member 701 for replacement holds an impregnation liquid. Here, the phrase "installation of an ink jet recording apparatus" refers to that the ink jet recording apparatus is prepared for the first use, and the phrase "installation of an absorption member" refers to that the absorption member 701 is prepared for the first use. In the present embodiment, wiping of the nozzle-forming surface 600 with the absorption member 701 may be at least wiping of the nozzle-forming surface 600 with the absorption member 701. At least a part of the adhesive material adhered to the nozzle-forming surface 600 may be removed by the wiping.

The driving mechanism 702 is a means for implementing wiping cleaning that removes adhesive materials adhered to the nozzle-forming surface 600 with an absorption member 701 by moving at least one of the absorption member 701 and the recording head 6 relatively to the other. The driving mechanism 702 may include a pressing member (not shown) for relatively press the absorption member 701 and the nozzle-forming surface 600 at 50 gf or more and 500 gf or less (for example, 75 gf or more and 300 gf or less). When the pressing force is 50 gf or more, the cleaning property is improved. Furthermore, even if there is a level difference between the nozzle plate (not shown) and the nozzle plate cover 605, prevention of adhesion or deposition of an ink in the gap or removal of an ink from the gap is excellently performed. In addition, when the pressing force is 500 gf or less, preservation of the liquid repellent film is further improved. The driving mechanism 702 is not particularly limited, but, for example, may be one in which the absorption member 701 and the nozzle-forming surface 600 are in contact with each other by pressing the absorption member 701 from the side opposite to the side that is brought into contact with the nozzle-forming surface 600. Alternatively, the recording head 6 is driven, and thereby the absorption member 701 and the nozzle-forming surface 600 are brought into contact with each other. Incidentally, the load herein is the sum of loads applied to the nozzle-forming surface 600 by the entire driving mechanism 702.

Further, the driving mechanism 702 may be one that relatively moves the absorption member 701 and the recording head 6 at a speed of 0.2 inch/s or more and 1.5 inch/s or less. Within the range above, the liquid repellent durability tends to be further improved. The wiping speed is usually approximately one-fifth to one-twenties of the moving speed of the recording head 6 during the recording of an image, but is not limited to this speed relationship.

The pressing member is not particularly limited and may be, for example, covered by an elastic member. The elastic member may have a shore A hardness of 10 or more and 60 or less or 10 or more and 50 or less. Consequently, the pressing member and the absorption member 701 are bent when pressed, and the absorption member 701 can be pushed inward against the uneven surface of the nozzle-forming surface 600. As a result, the cleaning property is further improved.

1.1.5. Impregnation Liquid

In the ink jet recording apparatus according to the present embodiment, an impregnation liquid may be used. The impregnation liquid is supplied to the nozzle-forming surface and/or the absorption member at least when a wiping cleaning step described later is carried out. Specifically, the impregnation liquid may be supplied and adhere to the nozzle-forming surface and/or the absorption member using a known spray device when the wiping cleaning step is carried out or may be previously held by the absorption member to adhere to the nozzle-forming surface when the wiping cleaning step is carried out. When the absorption member contains the impregnation liquid, a pigment can easily move from the surface to the inside of the absorption member. Consequently, physical damage on the nozzle-forming surface can be further reduced, and the liquid repellent durability and the discharge stability tend to be further improved.

The amount of the impregnation liquid impregnated in the absorption member may be 10 parts by mass or more and 200 parts by mass or less, 10 parts by mass or more and 120 parts by mass or less, or 30 parts by mass or more and 100 parts by mass or less based on 100 parts by mass of the absorption member. When the impregnated amount is within the above-mentioned range, the ink composition can be easily impregnated into the inside of the absorption member, and the damage of the nozzle-forming surface is further reduced.

Components that can be contained in the impregnation liquid will now be described.

The impregnation liquid may contain an organic sorbent and/or water and, for example, a surfactant. Consequently, the ink composition described later is easily absorbed in the absorption member. Incidentally, the impregnation liquid is not particularly limited as long as it can move a pigment from the surface to the inside of the absorption member.

The organic solvent that is contained in the impregnation liquid is not particularly limited, and examples thereof include glycerin; glycols, such as ethylene glycol, triethylene glycol, propylene glycol, tripropylene glycol, propanediol, butanediol, pentanediol, and hexylene glycol; and lower alkyl ethers of glycol, such as ethylene glycol monomethyl ether, diethylene glycol monomethyl ether, diethylene glycol monomethyl ether, and diethylene glycol monobutyl ether.

The content of the organic solvent may be 1 to 10 mass % or 3 to 7 mass % based on the total amount of the impregnation liquid. The content of water may be 85 to 99 mass % or 90 to 98 mass % based on the total amount of the impregnation liquid. When the contents of the organic solvent and water are within the above-mentioned ranges, the cleaning property tends to be further improved.

The surfactant contained in the impregnation liquid is not particularly limited, and, for example, the same surfactants exemplified in the description of the ink composition later can be used. The content of the surfactant may be 0.05 to 1.0 mass % based on the total amount of the impregnation liquid.

1.2. Ink Composition

The ink composition that is used in the ink jet recording apparatus according to the present embodiment contains a pigment, a crosslinkable component, a surfactant, and water. Each component contained in the ink composition that is used in the ink jet recording apparatus according to the present embodiment will now be described.

1.2.1. Pigment

The ink composition that is used in the ink jet recording apparatus according to the present embodiment contains a pigment. This pigment may be any pigment that is usually used in aqueous pigment inks.

As the pigment, for example, an organic pigment, such as azo, phthalocyanine, dye, condensed polycyclic, nitro, and nitroso pigments (e.g., Brilliant Carmine 6B, Lake Red C, Watching Red, Disazo Yellow, Hansa Yellow, Phthalocyanine Blue, Phthalocyanine Green, Alkali Blue, and Aniline Black); a metal, such as cobalt, iron, chromium, copper, zinc, lead, titanium, vanadium, manganese, and nickel; a metal oxide or sulfide; carbon black (C.I. Pigment Black 7), such as furnace carbon black, lamp black, acetylene black, and channel black (C.I. Pigment Black 7); or an inorganic pigment, such as ocher, ultramarine blue, and Prussian blue, can be used.

For further detail, examples of the carbon black that is used as a black pigment include No. 2300, No. 900, MCF88, No. 33, No. 40, No. 45, No. 52, MA7, MA8, MA100, and No. 2200B (which are trade names, manufactured by Mitsubishi Chemical Corporation); Color Black series FW1, FW2, FW2V, FW18, FW200, S150, S160, and S170, Printex series 35, U, V, and 140U, and Special Black series 6, 5, 4A, 4, and 250 (which are trade names, manufactured by Degussa-Huls AG); Conductex SC and Raven series 1255, 5750, 5250, 5000, 3500, 1255, and 700 (which are trade names, manufactured by Columbian Carbon Company); and Regal series 400R, 330R, and 660R, Mogul L, Monarch series 700, 800, 880, 900, 1000, 1100, 1300, and 1400, and Elftex 12 (which are trade names, manufactured by Cabot Corporation).

Examples of yellow pigments include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of magenta pigments include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245 and C.I. Pigment Violet 19, 23, 32, 33, 36, 38, 43, and 50.

Examples of cyan pigments include C.I. Pigment Blue 1, 2, 3, 15, 15:1, 15:2, 15:3, 15:34, 15:4, 16, 18, 22, 25, 60, 65, and 66 and C.I. Vat Blue 4 and 60.

Examples of pigments other than black, yellow, magenta, and cyan include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63.

The above-mentioned pigments may be used alone or in combination of two or more thereof.

The lower limit of the content of the pigment (solid content) contained in the ink composition may be 1 mass % or more, 3 mass % or more, or 4 mass % or more based on the total mass of the ink composition. The upper limit of the content of the pigment (solid content) may be 30 mass % or less, 15 mass % or less, or 12 mass % or less based on the total mass of the ink composition. When the content of the pigment (solid content) is within the range above, good friction fastness of a recorded matter tends to be ensured.

1.2.2. Crosslinkable Component

The ink composition that is used in the ink jet recording apparatus according to the present embodiment contains a crosslinkable component. In the present disclosure, the term "crosslinkable component" refers to a compound that can form a crosslinked structure through a reaction with a reactive group such as a hydroxyl group. When the ink composition contains a crosslinkable component, the crosslinkable component reacts with a reactive group, such as a hydroxyl group, included in the recording medium or resin particle (described later) to enable of further improving the friction fastness of a recorded matter. This crosslinkable component is not particularly limited, and examples thereof include a urethane resin having a crosslinkable group and a crosslinking agent. The urethane resin having a crosslinkable group and the crosslinking agent will now be described.

Incidentally, the recording medium is not particularly limited, and examples thereof include various types of cloth. The material constituting the cloth is not particularly limited, and examples thereof include natural fibers, such as cotton, hemp, wool, and silk; synthetic fibers, such as polypropylene, polyester, acetate, triacetate, polyamide, and polyurethane; and biodegradable fibers, such as polylactic acid, and blended fibers thereof may be used. The cloth may be in any form of the fibers mentioned above, such as woven fabric, knitted fabric, and non-woven fabric.

1.2.2.1. Urethane Resin Having a Crosslinkable Group

The crosslinkable component contained in the ink composition may be, for example, a urethane resin having a crosslinkable group. In such a case, the term "crosslinkable group" refers to a group that can form a crosslinked structure by a reaction, and the terminal group of a urethane resin is not included in the crosslinkable group. When the ink composition contains a urethane resin having a crosslinkable group, a crosslinked structure is formed with a reactive group, such as a hydroxy group, of the recording medium to improve the fixation of the ink composition to a recording medium, resulting in more excellent friction fastness. The crosslinkable group may be any group that can form a bond by a reaction with an active hydrogen-containing group containing active hydrogen, such as a hydroxyl group, included in the recording medium. Examples of the crosslinkable group include an isocyanate group and a silanol group. The isocyanate group as a crosslinkable group may be, for example, a blocked isocyanate group having a form chemically protected by capping, blocking, etc. The blocked isocyanate group is activated by deprotection by heating, and the activated isocyanate reacts with the active hydrogen-containing group, such as a hydroxyl group, of the recording medium to form a bond, such as a urethane bond, a urea bond, or an allophanate bond.

In particular, the crosslinkable group may be one or more of a blocked isocyanate group and a silanol group from the viewpoint of further improving the friction fastness and may be a blocked isocyanate group from the viewpoint of further improving the wet friction fastness.

In the present specification, the term "urethane resin" refers to a resin containing a urethane bond, a urea bond, or an allophanate bond formed by a reaction of the isocyanate group with an active hydrogen-containing group, such as a hydroxyl group, an amino group, a urethane bond group, or a carboxyl group. The urethane resin may be a polyether skeleton urethane resin including an ether bond, in addition to a urethane bond, in the main chain, a polyester urethane resin having a polyester skeleton, or a polycarbonate urethane resin having a polycarbonate skeleton.

Blocked isocyanate (chemically protected isocyanate) contains a potential isocyanate group in which the isocyanate group is blocked by a blocking agent and can be obtained by, for example, a reaction between a polyisocyanate compound and a blocking agent.

Examples of the polyisocyanate compound include a polyisocyanate monomer and a polyisocyanate derivative. Examples of the polyisocyanate monomer include polyisocyanate, such as aromatic polyisocyanate, aromatic/aliphatic polyisocyanate, aliphatic polyisocyanate, and alicyclic polyisocyanate. These polyisocyanate monomers can be used alone or in combination of two or more thereof.

Examples of the polyisocyanate derivative include multimers of the above-mentioned polyisocyanate monomers (for example, dimer, trimer (e.g., an isocyanurate modified product and an iminooxadiazinedione modified product), pentamer, and heptamer), an allophanate modified product (for example, an allophanate modified product generated by a reaction between a polyisocyanate monomer mentioned above and a low molecular weight polyol described later), a polyol modified product (for example, a polyol modified product (alcohol adduct) generated by a reaction between a polyisocyanate monomer and a low molecular weight polyol described later), a biuret modified product (for example, a biuret modified product generated by a reaction between a polyisocyanate monomer mentioned above and water or an amine), a urea modified product (for example, a urea modified product generated by a reaction between a polyisocyanate monomer mentioned above and diamine), an oxadiazinetrione modified product (for example, oxadiazinetrione generated by a reaction between a polyisocyanate monomer mentioned above and a carbon dioxide gas), a carbodiimide modified product (for example, a carbodiimide modified product generated by a decarboxylation condensation reaction of a polyisocyanate monomer mentioned above), a uretdione modified product, and a uretonimine modified product.

Incidentally, when two or more polyisocyanate compounds are used in combination, for example, two or more polyisocyanate compounds may be simultaneously reacted during manufacturing the blocked isocyanate, alternatively, blocked isocyanates individually obtained by using each polyisocyanate compound may be mixed.

While blocking an isocyanate group and inactivates it, the blocking agent regenerates or activates the isocyanate group after deblocking and also has a catalytic action for activating the isocyanate group in the blocked and deblocked states.

Examples of the blocking agent include an imidazole-based compound, an imidazoline-based compound, a pyrimidine-based compound, a guanidine-based compound, an alcohol-based compound, a phenol-based compound, an active methylene-based compound, an amine-based compound, an imine-based compound, an oxime-based compound, a carbamic acid-based compound, a urea-based compound, an acid amide-based (lactam-based) compound, an acid imide-based compound, a triazole-based compound, a pyrazole-based compound, a mercaptan-based compound, and a bisulfite.

Examples of the imidazole-based compound include imidazole (dissociation temperature: 100° C.), benzimidazole (dissociation temperature: 120° C.), 2-methylimidazole (dissociation temperature: 70° C.), 4-methylimidazole (dissociation temperature: 100° C.), 2-ethylimidazole (dissociation temperature: 70° C.), 2-isopropylimidazole, 2,4-dimethylimidazole, and 2-ethyl-4-methylimidazole.

Examples of the imidazoline-based compound include 2-methylimidazoline (dissociation temperature: 110° C.) and 2-phenylimidazoline.

Examples of the pyrimidine-based compound include 2-methyl-1,4,5,6-tetrahydropyrimidine.

Examples of the guanidine-based compound include 3,3-dialkylguanidine, such as 3,3-dimethylguanidine, for example, 1,1,3,3-tetraalkylguanidine, such as 1,1,3,3-tetramethylguanidine (dissociation temperature: 120° C.), and 1,5,7-triazabicyclo[4.4.0]dec-5-ene.

Examples of the alcohol-based compound include methanol, ethanol, 2-propanol, n-butanol, s-butanol, 2-ethylhexyl alcohol, 1- or 2-octanol, cyclohexyl alcohol, ethylene glycol, benzyl alcohol, 2,2,2-trifluoroethanol, 2,2,2-trichloroethanol, 2-(hydroxymethyl)furan, 2-methoxyethanol, methoxypropanol, 2-ethoxyethanol, n-propoxyethanol, 2-butoxyethanol, 2-ethoxyethoxyethanol, 2-ethoxybutoxyethanol, butoxyethoxyethanol, 2-butoxyethylethanol, 2-butoxyethoxyethanol, N,N-dibutyl-2-hydroxyacetamide, N-hydroxysuccinimide, N-morpholineethanol, 2,2-dimethyl-1,3-dioxolane-4-methanol, 3-oxazolidineethanol, 2-hydroxymethylpyridine (dissociation temperature: 140° C.), furfuryl alcohol, 12-hydroxystearic acid, triphenylsilanol, and 2-hydroxyethyl methacrylate.

Examples of the phenol-based compound include phenol, cresol, ethylphenol, n-propylphenol, isopropylphenol, n-butylphenol, s-butylphenol, t-butylphenol, n-hexylphenol, 2-ethylhexylphenol, n-octylphenol, n-nonylphenol, di-n-propylphenol, diisopropylphenol, isopropylcresol, di-n-butylphenol, di-s-butylphenol, di-t-butylphenol, di-n-octylphenol, di-2-ethylhexylphenol, di-n-nonylphenol, nitrophenol, bromophenol, chlorophenol, fluorophenol, dimethylphenol, styrenated phenol, methyl salicylate, methyl 4-hydroxybenzoate, benzyl 4-hydroxybenzoate, 2-ethylhexyl hydroxybenzoate, 4-[(dimethylamino)methyl]phenol, 4-[(dimethylamino)methyl]nonylphenol, bis(4-hydroxyphenyl)acetic acid, 2-hydroxypyridine (dissociation temperature: 80° C.), 2- or 8-hydroxyquinoline, 2-chloro-3-pyridinol, and pyridine-2-thiol (dissociation temperature: 70° C.).

Examples of the active methylene-based compound include Meldrum's acid, dialkyl malonate (e.g., dimethyl malonate, diethyl malonate, di-n-butyl malonate, di-t-butyl malonate, di-2-ethylhexyl malonate, methyl n-butyl malonate, ethyl n-butyl malonate, methyl s-butyl malonate, ethyl s-butyl malonate, methyl t-butyl malonate, ethyl t-butyl malonate, diethyl methylmalonate, dibenzyl malonate, diphenyl malonate, benzylmethyl malonate, ethylphenyl malonate, t-butylphenyl maloate, and isopropylidene malonate), alkyl acetoacetate (e.g., methyl acetoacetate, ethyl acetoacetate, n-propyl acetoacetate, isopropyl acetoacetate, n-butyl acetoacetate, t-butyl acetoacetate, benzyl acetoacetate, and phenyl acetoacetate), 2-acetoacetoxyethyl methacrylate, acetylacetone, and ethyl cyanoacetate.

Examples of the amine-based compound include dibutylamine, diphenylamine, aniline, N-methylaniline, carbazole, bis(2,2,6,6-tetramethylpiperidinyl)amine, di-n-propylamine, diisopropylamine (dissociation temperature: 130° C.), isopropylethylamine, 2,2,4- or 2,2,5-trimethylhexamethyleneamine, N-isopropylcyclohexylamine (dissociation temperature: 140° C.), dicyclohexyamine (dissociation temperature: 130° C.), bis(3,5,5-trimethylcyclohexyl)amine, piperidine, 2,6-dimethylpiperidine (dissociation temperature: 130° C.), t-butylmethylamine, t-butylethylamine (dissociation temperature: 120° C.), t-butylpropylamine, t-butylbutylamine, t-butylbenzylamine (dissociation temperature: 120° C.), t-butylphenylamine, 2,2,6-trimethylpiperidine, 2,2,6,6-tetramethylpiperidine (dissociation temperature: 80° C.), (dimethylamino)-2,2,6,6-tetramethylpiperidine, 2,2,6,6-tetramethyl-4-piperidine, 6-methyl-2-piperidine, and 6-aminocaproic acid.

Examples of the imine-based compound include ethyleneimine, polyethyleneimine, 1,4,5,6-tetrahydropyrimidine, and guanidine.

Examples of the oxime-based compound include formaldoxime, acetoaldoxime, acetoxime, methylethylketoxime (dissociation temperature: 130° C.), cyclohexanone oxime, diacetylmonooxime, benzophenoxime, 2,2,6,6-tetramethylcyclohexanone oxime, diisopropyl ketone oxime, methyl t-butyl ketone oxime, diisobutyl ketone oxime, methyl isobutyl ketone oxime, methyl isopropyl ketone oxime, methyl 2,4-dimethylpentyl ketone oxime, methyl 3-ethyl heptyl ketone oxime, methyl isoamyl ketone oxime, n-amyl ketone oxime, 2,2,4,4-tetramethyl-1,3-cyclobutanedione monooxime, 4,4'-dimethoxybenzophenone oxime, and 2-heptanone oxime.

Examples of the carbamic acid-based compound include phenyl N-phenylcarbamate.

Examples of the urea-based compound include urea, thiourea, and ethyleneurea.

Examples of the acid amide-based (lactam-based) compound include acetanilide, N-methylacetamide, acetic acid amide, ε-caprolactam, δ-valerolactam, γ-butyrolactam, pyrrolidone, 2,5-piperazinedione, and laurolactam.

Examples of the acid imide-based compound include succinimide, maleic imide, and phthalimide.

Examples of the triazole-based compound include 1,2,4-triazole and benzotriazole.

Examples of the pyrazole-based compound include pyrazole, 3,5-dimethylpyrazole (dissociation temperature: 120° C.), 3,5-diisopropylpyrazole, 3,5-diphenylpyrazole, 3,5-di-t-butyl pyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole.

Examples of the mercaptan-based compound include butyl mercaptan, dodecyl mercaptan, and hexyl mercaptan.

Examples of the bisulfite include sodium bisulfite.

Furthermore, the blocking agent is not limited to those mentioned above, and examples thereof include other blocking agents, such as benzoxazolone, isatoic anhydride, and tetrabutylphosphonium acetate.

Incidentally, regarding some of the compounds exemplified above, the dissociation temperatures thereof are each written together as the temperature to regenerate the isocyanate group.

These blocking agents can be used alone or in combination of two or more thereof. The dissociation temperature of a blocking agent can be appropriately selected. The dissociation temperature may be, for example, 60° C. or more and 230° C. or less, 80° C. or more and 200° C. or less, 100° C. or more and 180° C. or less, or 110° C. or more and 160° C. or less. In such a temperature range, the pot life of the ink composition can be sufficiently long.

In addition, the main chain of the urethane resin having a crosslinkable group may be any type, such as a polyether type containing an ether bond, a polyester type containing an ester bond, or a polycarbonate type containing a carbonate bond. When the urethane resin having a crosslinkable group has been crosslinked (crosslinked product), the elongation at break and the 100% modulus thereof can be controlled by changing the density of a crosslinking point and the type of such a main chain. Among these examples, a urethane resin having a crosslinkable group having a polycarbonate skeleton or a polyether skeleton has a good balance between the elongation at break and the 100% modulus and easily improves the friction fastness and the texture of a recorded matter. In particular, a urethane resin having a polycarbonate skeleton tends to improve the friction fastness.

In addition, after formation of crosslinking (a crosslinked product) of a urethane resin having a crosslinkable group, the elongation at break may be 150% or more, 170% or more, 200% or more, or 300% or more. The texture of a recorded matter can be improved by selecting the density of a crosslinking point and the type of a main chain so as to give such an elongation at break.

Here, as the elongation at break, it is possible to use, for example, the value obtained by curing an emulsion of a urethane resin having a crosslinkable group to produce a film having a thickness of about 60 μm and measuring the elongation at break under conditions of a tension test gauge length of 20 mm and a tension rate of 100 mm/min. As the 100% modulus, it is possible to use the value obtained by measuring the tensile stress when the film is 100% stretched relative to its original length in the tension test. The film for the measurement may be formed using an emulsion of a urethane resin having a crosslinkable group or may be formed by molding of the same type of resin, but the film may be formed using an emulsion resin.

The urethane resin having a crosslinkable group may be blended in an emulsion form. Such a resin emulsion is a urethane resin emulsion of a so-called autoreactive type, and a commercially available urethane resin emulsion having an isocyanate group blocked by a blocking agent having a hydrophilic group can be used.

Examples of the commercially available urethane resin having a crosslinkable group include "Eternacoll UW-1501F" manufactured by Ube Industries, Ltd., "Trixene series" such as "Trixene BI7986" and "Trixene BI7987" manufactured by Baxenden Chemicals Ltd., "Byhidule BL2781" manufactured by Sumika Bayer Urethane Co., Ltd., "Takenate WB series" manufactured by Mitsui Chemicals & SKC Polyurethanes Inc., "Duranate WM44-L70G" manufactured by Asahi Kasei Corporation, "Turboset TM2025" manufactured by The Lubrizol Corporation, and "Takelac WS series" such as "Takelac WS-4022", "Takelac WS-5984", and "Takelac WS-5100" manufactured by Mitsui Chemicals & SKC Polyurethanes Inc. Examples of the polycarbonate urethane resin include "Eternacoll UW-1501F" manufactured by Ube Industries, Ltd., and "Takelac WS-5100". Examples of the polyester urethane resin include "Takelac WS-4022" and "Takelac WS-5984". Examples of the resin having a blocked isocyanate group as the crosslinkable group include "Eternacoll UW-1501F" manufactured by Ube Industries, Ltd., "Trixene series" such as "Trixene BI7986" and "Trixene BI7987" manufactured by Baxenden Chemicals Ltd., "Byhidule BL2781" manufactured by Sumika Bayer Urethane Co., Ltd., "Takenate WB series" manufactured by Mitsui Chemicals & SKC Polyurethanes Inc., "Duranate WM44-L70G" manufactured by Asahi Kasei Corporation, and "Turboset TM2025" manufactured by The Lubrizol Corporation. Examples of the resin having a silanol group as the crosslinkable group include "Takelac WS-4022", "Takelac WS-5984", and "Takelac WS-5100" manufactured by Mitsui Chemicals & SKC Polyurethanes Inc.

These urethane resins having a crosslinkable group are used alone or in combination of two or more thereof.

In the present embodiment, the solid content concentration of the urethane resin containing a crosslinkable group may be 1.0 mass % or more and 10.0 mass % or less, 3.0 mass % or more and 9.0 mass % or less, or 4.0 mass % or more and 8.0 mass % or less based on the total mass of the ink composition. When the solid content concentration of the urethane resin containing a crosslinkable group is within the above-mentioned range, the friction fastness of a recorded matter tends to be further improved.

The urethane resin containing a crosslinkable group may have a glass transition temperature (Tg) of −10° C. or less, −15° C. or less, or −20° C. or less. When the glass transition temperature is within the range above, since the particles are in a soft state at room temperature (25° C.), physical damage on the nozzle-forming surface is further reduced, and the liquid repellent durability and the discharge stability tend to be further excellent. At the same time, from the viewpoint of ensuring the friction fastness of a recorded matter, the glass transition temperature of the resin may be −50° C. or more, −40° C. or more, or −30° C. or more. Incidentally, the glass transition temperature (Tg) of a resin can be confirmed by a usual method using, for example, differential scanning calorimetry (DSC).

1.2.2.2. Crosslinking Agent

The crosslinkable component contained in the ink composition may be, for example, a crosslinking agent. When the ink composition contains a resin particle described later, the crosslinking agent reacts with the reactive group, such as a hydroxyl group, of the resin particle by heating to a temperature equal to or higher than the crosslinking reaction starting temperature and thereby forms a strong coating film. Accordingly, the friction fastness of a recorded matter can be further improved.

As the crosslinking agent, at least one of a blocked isocyanate compound or a carbodiimide compound may be used. These compounds have a reactivity with the functional group of a resin particle described later and therefore easily form a network structure by a crosslinking reaction. For example, the blocked isocyanate compound reacts with the hydroxyl group of a resin particle described later by heating to a temperature equal to or higher than the crosslinking reaction starting temperature and thereby forms a urethane bond. This is because that the blocking agent inactivating the isocyanate group of the blocked isocyanate compound is dissociated by heating to a prescribed temperature to activate the isocyanate group and thereby the crosslinking reaction proceeds. In addition, in a carbodiimide compound, the carbodiimide group thereof reacts with the carboxy group of a resin particle described later by heating to a temperature equal to or higher than the crosslinking reaction starting temperature and thereby forms an amide bond.

Specifically, the type of the crosslinking agent may be a blocked isocyanate-based compound in which a TMP (trimethylol propane) adduct product or an isocyanurate product of HDI (hexamethylene diisocyanate), H6XDI (hydrogenated xylylene diisocyanate), IPDI (isophorone diisocyanate), or H12MDI (dicyclohexylmethane diisocyanate) is blocked, such as SU-268A (manufactured by Meisei Chemical Works, Ltd.) and MF-B60B (manufactured by Asahi Kasei Corporation). The carbodiimide compound may be a polypropyl carbodiimide compound having a plurality of carbodiimide groups in the molecule, such as Carbodilite V-02 (manufactured by Nisshinbo Chemical Inc.).

When a blocked isocyanate compound or a carbodiimide compound is used as the crosslinking agent, the crosslinking reaction proceeds better by using an urethane resin as a resin particle described later.

The type of the crosslinking agent is not limited to the above-mentioned two types, and polyallylamine or oxazoline may be used. In addition, in some cases, a catalyst may be added for accelerating crosslinking. Examples of the catalyst include an organic peroxide and an azo compound.

The addition amount of the crosslinking agent may be 0.1 mass % or more and 15 mass % or less, 0.1 mass % or more and 10 mass % or less, or 5 mass % or more and 8 mass % or less based on the total mass of the ink composition. When the amount is 10 mass % or less, the texture of a recorded matter is improved, and when the amount is 5 mass % or more, the friction fastness is improved.

1.2.3. Surfactant

The ink composition that is used in the ink jet recording apparatus according to the present embodiment contains a surfactant. The surfactant is not particularly limited, and examples thereof include an acetylene glycol-based surfactant, a fluorine-based surfactant, and a silicone-based surfactant. In addition, from the viewpoint of easily adjusting the contact angle of the ink composition on the nozzle-forming surface 600 within a certain range, the surfactant may be an acetylene glycol-based surfactant.

The acetylene glycol-based surfactant is not particularly limited, and examples thereof include Surfynol series 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (which are all trade names, manufactured by AirProducts and Chemicals, Inc.), Olfine series B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (which are all trade names, manufactured by Nissin Chemical Industry Co., Ltd.), and Acetylenol series E00, E00P, E40, and E100 (which are all trade names, manufactured by Kawaken Fine Chemicals Co., Ltd.).

The fluorine-based surfactant may be a fluorine-modified polymer, and examples thereof include BYK-3440 (manufactured by BYK Japan K.K.), Surflon series S-241, S-242, and S-243 (which are trade names, manufactured by AGC Seimi Chemical Co., Ltd.), and Ftergent 215M (manufactured by NEOS Co., Ltd.).

The silicone-based surfactant is not particularly limited, and examples thereof include a polysiloxane-based compound. The polysiloxane-based compound is not particularly limited, and examples thereof include polyether-modified organosiloxane. Examples of commercially available products of the polyether-modified organosiloxane include BYK-306, BYK-307, BYK-333, BYK-341, BYK-345, BYK-346, and BYK-348 (which are trade names, manufactured by BYK Japan K.K.) and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (which are trade names, manufactured by Shin-Etsu Chemical Co., Ltd.).

The content of the surfactant may be 0.1 mass % or more and 1.0 mass % or less, 0.15 mass % or more and 0.5 mass % or less, or 0.2 mass % or more and 0.4 mass % or less based on the total mass of the ink composition. When the content of the surfactant is within the range above, it is possible to suitably adjust the contact angle of the ink composition on the nozzle-forming surface within a certain range, and therefore the liquid repellent durability and the discharge stability tend to be more excellent.

1.2.4. Water

The ink composition that is used in the ink jet recording apparatus according to the present embodiment contains water as a main solvent. As the water, pure water or ultrapure water, such as deionized water, ultrafiltered water, reverse osmosis water, and distilled water, may be used. In particular, when water sterilized by, for example, UV irradiation or addition of hydrogen peroxide is used, occurrence of mold or bacteria is prevented to enable long-term storage of the ink composition.

1.2.5. Other Component

The ink composition that is used in the ink jet recording apparatus according to the present embodiment may contain a component other than the above-described components. Examples of such components are shown below.

Resin Particle

The ink composition that is used in the ink jet recording apparatus according to the present embodiment may contain a resin particle for the purpose of further improving the friction fastness of a recorded matter.

Examples of such resin particles include resin particles made of a urethane resin, an acrylic resin, a fluorene resin, a polyolefin resin, a rosin modified resin, a terpene resin, a polyester resin, a polyamide resin, an epoxy resin, a vinyl chloride resin, or an ethylene vinyl acetate resin. These resin particles are often handled in an emulsion form, but may have properties of powder. One type of resin particles may be used, or a combination of two or more types of resin particles may be used.

The urethane resin is a generic name of resins having a urethane bond. As the urethane resin, for example, a polyether urethane resin having an ether bond in the main chain in addition to the urethane bond, a polyester urethane resin having an ester bond in the main chain in addition to the urethane bond, or a polycarbonate urethane resin having a carbonate bond in the main chain in addition to the urethane bond may be used. Incidentally, the above-described urethane resin having a crosslinkable group contained in the ink composition may be used.

As the urethane resin, a commercial product may be used. For example, a commercial product selected from Superflex series 210, 460, 460s, 840, and E-4000 (trade names, manufactured by DKS Co., Ltd.), Resamine series D-1060, D-2020, D-4080, D-4200, D-6300, and D-6455 (trade names, manufactured by Dainichiseika Color & Chemicals Mfg. Co., Ltd.), Takelac series WS-6020, WS-6021, and W-512-A-6 (trade names, manufactured by Mitsui Chemicals & SKC Polyurethanes, Inc.), Sancure 2710 (trade name, manufactured by The Lubrizol Corporation), and Permarin UA-150 (trade name, manufactured by Sanyo Chemical Industries, Ltd.) may be used.

The acrylic resin is a generic name of polymers obtained by polymerizing at least an acrylic monomer, such as (meth)acrylic acid or (meth)acrylic acid ester, as one component, and examples thereof include a resin obtained from an acrylic monomer and a copolymer of an acrylic monomer and another monomer. Examples of the acrylic resin include an acrylic-vinyl resin, which is a copolymer of an acrylic monomer and a vinyl monomer, and a copolymer of an acrylic monomer and a vinyl monomer such as styrene. As the acrylic monomer, for example, acryl amide and acrylonitrile can also be used.

The resin particle of which the raw material is an acrylic resin may be a commercial product, and a commercial product selected from, for example, FK-854 and Movinyl series 952B and 718A (trade names, manufactured by Japan Coating Resin Corporation), Nipol series LX852 and LX874 (trade names, manufactured by Zeon Corporation), Polysol AT860 (manufactured by Showa Denko K.K.), and Voncoat series AN-1190S, YG-651, AC-501, AN-1170, and 4001 (trade names, acrylic resin emulsion, manufactured by DIC Corporation) may be used.

Incidentally, in the present specification, the acrylic resin may be a styrene acrylic resin as described above. In addition, in the present specification, the notation "(meth) acrylic" means at least one of acrylic and methacrylic.

The styrene acrylic resin is a copolymer prepared from a styrene monomer and an acrylic monomer, and examples thereof include a styrene-acrylic acid copolymer, a styrene-methacrylic acid copolymer, a styrene-methacrylic acid-acrylic acid ester copolymer, a styrene-α-methylstyrene-acrylic acid copolymer, and a styrene-α-methylstyrene-acrylic acid-acrylic acid ester copolymer.

As the styrene acrylic resin, a commercial product may be used, and examples thereof include Joncryl series 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade names, manufactured by BASF SE) and Movinyl series 966A, 975N, and 6960 (trade names, manufactured by Japan Coating Resin Corporation).

The vinyl chloride resin may be a vinyl chloride-vinyl acetate copolymer.

The polyolefin resin has olefin, such as ethylene, propylene, or butylene, in the structure skeleton, and an appropriately selected known polyolefin resin can be used. As the olefin resin, a commercial product can be used and may be selected from, for example, Arrowbase series CB-1200 and CD-1200 (trade names, manufactured by Unitika Ltd.).

The resin particle may be supplied in an emulsion form, and examples of the commercial products of such resin emulsions include Microgel series E-1002 and E-5002 (trade names, styrene-acrylic resin emulsion, manufactured by Nippon Paint Co., Ltd.); Voncoat series AN-1190S, YG-651, AC-501, AN-1170, 4001, and 5454 (trade names, styrene-acrylic resin emulsion, manufactured by DIC Corporation); Polysol series AM-710, AM-920, AM-2300, AP-4735, AT-860, and PSASE-4210E (acrylic resin emulsion), Polysol AP-7020 (styrene-acrylic resin emulsion), Polysol SH-502 (vinyl acetate resin emulsion), Polysol series AD-13, AD-2, AD-10, AD-96, AD-17, and AD-70 (ethylene-vinyl acetate resin emulsion), and Polysol PSASE-6010 (ethylene-vinyl acetate resin emulsion) (trade names, manufactured by Showa Denko K.K.); SAE1014 (trade name, styrene-acrylic resin emulsion, manufactured by Zeon Corporation); Saivinol SK-200 (trade name, acrylic resin emulsion, manufactured by Saiden Chemical Industry Co., Ltd.); AE-120A (trade name, acrylic resin emulsion, manufactured by JSR Corporation); AE373D (trade name, carboxy modified styrene-acrylic resin emulsion, manufactured by Emulsion Technology Co., Ltd.); Seikadyne 1900W (trade name, ethylene-vinyl acetate resin emulsion, manufactured by Dainichiseika Color & Chemicals Mfg. Co., Ltd.); Vinyblan 2682 (acrylic resin emulsion), Vinyblan 2886 (vinyl acetate-acrylic resin emulsion), Vinyblan 5202 (acetic acid acrylic resin emulsion), and Vinyblan series 700 and 2586 (trade names, manufactured by Nissin Chemical Industry Co., Ltd.); Elitel series KA-5071S, KT-8803, KT-9204, KT-8701, KT-8904, and KT-0507 (trade names, polyester resin emulsion, manufactured by Unitika Ltd.); Hitech SN-2002 (trade name, polyester resin emulsion, manufactured by TOHO Chemical Industry Co., Ltd.); Takelac series W-6020, W-635, W-6061, W-605, W-635, and W-6021 (trade names, urethane resin emulsion, manufactured by Mitsui Chemicals & SKC Polyurethanes, Inc.); Superflex series 870, 800, 150, 420, 460, 470, 610, 620, and 700 (trade names, urethane resin emulsion, manufactured by DKS Co., Ltd.); Permarin UA-150 (urethane resin emulsion, manufactured by Sanyo Chemical Industries, Ltd.); Sancure 2710 (urethane resin emulsion, manufactured by The Lubrizol Corporation); NeoRez series R-9660, R-9637, and R-940 (urethane resin emulsion, manufactured by Kusumoto Chemicals, Ltd.); Adeka Bontighter series HUX-380 and 290K (urethane resin emulsion, manufactured by ADEKA Corporation); Movinyl series 966A and 7320 (manufactured by Japan Coating Resin Corporation); Joncryl series 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (manufactured by BASF SE); NK Binder R-5HN (manufactured by Shin-Nakamura Chemical Co., Ltd.); Hydran WLS-210 (non-crosslinkable polyurethane, manufactured by DIC Corporation); and Joncryl 7610 (manufactured by BASF SE), and a commercial product selected therefrom may be used.

The content of the resin particle contained in the ink composition is 0.1 mass % or more and 20 mass % or less as the solid content based on the total mass of the ink composition and may be 1.0 mass % or more and 15.0 mass % or less, 2.0 mass % or more and 10.0 mass % or less, or 3.0 mass % or more and 8.0 mass % or less.

The resin particle may be a urethane resin particle from the viewpoint of more excellent friction fastness of a recorded matter.

The glass transition temperature (Tg) of the resin particle may be −10° C. or less, −15° C. or less, or −20° C. or less. When the glass transition temperature of the resin particle is within the range above, since the resin particle is in a soft state at room temperature (25° C.), physical damage on the nozzle-forming surface is further reduced, and the liquid repellent durability and the discharge stability tend to be further excellent. At the same time, from the viewpoint of ensuring the friction fastness of a recorded matter, the glass transition temperature of the resin particle may be −50° C. or more, −40° C. or more, or −30° C. or more. Incidentally, the glass transition temperature (Tg) of a resin particle can be verified by a usual method using, for example, differential scanning calorimetry (DSC).

Humectant

The ink composition that is used in the ink jet recording apparatus according to the present embodiment may contain an organic solvent having a moistening effect for the purpose of preventing clogging in the vicinity of a nozzle of the recording head.

Examples of the humectant include polyhydric alcohols, such as glycerin, 1,2,6-hexanetriol, trimethylolpropane, pentamethylene glycol, trimethylene glycol, ethylene glycol, propylene glycol, diethylene glycol, triethylene glycol, tetraethylene glycol, pentaethylene glycol, polyethylene glycol having a number average molecular weight of 2000 or less, dipropylene glycol, tripropylene glycol, isobutylene glycol, 2-butene-1,4-diol, 2-ethyl-1,3-hexanediol, 2-methyl-2,4-pentanediol, mesoerythritol, and pentaerythritol; solid humectants, for example, saccharides, sugar alcohols, hyaluronic acids, and ureas, such as glucose, mannose, fructose, ribose, xylose, arabinose, galactose, aldonic acid, glucitol (sorbitol), maltose, cellobiose, lactose, sucrose, trehalose, and maltotriose; alkyl alcohols having 1 to 4 carbon atoms, such as ethanol, methanol, butanol, propanol, and isopropanol; and 2-pyrrolidone, N-methyl-2-pyrrolidone, 1,3-dimethyl-2-imidazolidinone, formamide, acetamide, dimethyl sulfoxide, sorbitol, sorbitan, acetin, diacetin, triacetin, and sulfolane.

The humectants may be used alone or in combination of two or more thereof.

The content of the humectant may be 2.0 mass % or more and 20.0 mass % or less or 5.0 mass % or more and 15.0 mass % or less based on the total mass of the ink composition. When the content of the humectant is within the range above, it is possible to ensure appropriate physical values (such as viscosity) of the ink composition and to ensure the quality and reliability of recording.

Dispersant

The ink composition that is used in the ink jet recording apparatus according to the present embodiment may contain a dispersant for dispersing a pigment. The ink composition contains a pigment which may be stably dispersed and retained in a dispersive medium. Examples of the method therefor include a method of dispersing with a dispersant, such as a water soluble resin and/or a water dispersible resin and a method of chemically or physically introducing a hydrophilic functional group into a pigment particle surface and enabling dispersion and/or dissolution in water without using the dispersant. Among these methods, the method of dispersing with a dispersant is excellent in the dispersion stability of a pigment in an ink composition, the discharge stability from head nozzle holes when applied to an ink jet method, and the durability, such as adhesion and scratch resistance, of the resulting image.

Examples of the dispersant include polyvinyl alcohols, polyacrylic acid, an acrylic acid-acrylonitrile copolymer, a vinyl acetate-acrylic acid ester copolymer, an acrylic acid-acrylic acid ester copolymer, a styrene-acrylic acid copolymer, a styrene-methacrylic acid copolymer, a styrene-methacrylic acid-acrylic acid ester copolymer, a styrene-α-methylstyrene-acrylic acid copolymer, a styrene-α-methylstyrene-acrylic acid-acrylic acid ester copolymer, a styrene-maleic acid copolymer, a styrene-maleic anhydride copolymer, a vinylnaphthalene-acrylic acid copolymer, a vinylnaphthalene-maleic acid copolymer, a vinyl acetate-maleic acid ester copolymer, a vinyl acetate-crotonic acid copolymer, and a vinyl acetate-acrylic acid copolymer, and salts thereof. Among these examples, a copolymer of a monomer having a hydrophobic functional group and a monomer having a hydrophilic functional group or a polymer of a monomer having both a hydrophobic functional group and a hydrophilic functional group may be used. The form of the copolymer may be any form of a random copolymer, a block copolymer, an alternating copolymer, and a graft copolymer.

The content proportion of the dispersant may be 5 parts by mass or more and 200 parts by mass or less or 20 parts by mass or more and 120 parts by mass or less based on 100 parts by mass of the pigment content in the ink composition.

Inorganic Alkali Compound

The ink composition that is used in the ink jet recording apparatus according to the present embodiment may contain an inorganic alkali compound (inorganic base compound). The inorganic alkali compound has a property of increasing the pH of the ink composition. In addition, the inorganic alkali compound has at least a function of enhancing the dispersion stability of a crosslinkable component and/or a function of improving the re-dispersibility of a crosslinkable component.

Examples of the inorganic alkali compound include a hydroxide of an alkali metal or an alkaline earth metal, a carbonate of an alkali metal or an alkaline earth metal, and a phosphate of an alkali metal or an alkaline earth metal.

Examples of the hydroxide of an alkali metal include lithium hydroxide, sodium hydroxide, and potassium hydroxide. Examples of the hydroxide of an alkaline earth metal include calcium hydroxide and magnesium hydroxide.

Examples of the carbonate of an alkali metal include lithium carbonate, lithium hydrogen carbonate, potassium carbonate, potassium hydrogen carbonate, sodium carbonate, and sodium hydrogen carbonate. Examples of the carbonate of an alkaline earth metal include calcium carbonate.

Examples of the phosphate of an alkali metal include lithium phosphate, potassium phosphate, trisodium phosphate, and disodium hydrogen phosphate. Examples of the phosphate of an alkaline earth metal include calcium phosphate and calcium hydrogen phosphate.

The ink composition that is used in the ink jet recording apparatus according to the present embodiment may contain a plurality of types of the inorganic alkali compounds exemplified above. The total content of the inorganic alkali compounds is 0.01 mass % or more and 0.8 mass % or less based on the total amount of the ink composition and may be 0.02 mass % or more and 0.6 mass % or less, 0.03 mass % or more and 0.4 mass % or less, 0.04 mass % or more and 0.3 mass % or less, 0.05 mass % or more and 0.2 mass % or less, or 0.05 mass % or more and 0.1 mass % or less.

When the blending amount of the inorganic alkali compound is within such a range, the pH of the ink composition can be sufficiently increased, and it is possible to exhibit a function of enhancing the dispersion stability of the crosslinkable component and/or a function of improving the re-dispersibility of the crosslinkable component.

Others

The ink composition that is used in the ink jet recording apparatus according to the present embodiment may contain, in addition to the above-described components, a wax, a preservative/fungicide, a rust inhibitor, a chelating agent, a viscosity regulator, an antioxidant, a urea, an amine, and a saccharide.

1.2.6. Method for Preparing Ink Composition

The ink composition that is used in the ink jet recording apparatus according to the present embodiment is prepared by mixing each component at an arbitrary order and removing impurities by, for example, filtration as needed. As the method for mixing each component, a method of sequentially adding materials to a container equipped with a stirring device, such as a mechanical stirrer or a magnetic stirrer, and stirring and mixing the materials is suitably used.

1.2.7. Physical Properties

The contact angle of the ink composition that is used in the ink jet recording apparatus according to the present embodiment on the above-described nozzle-forming surface is 50° or more and may be 55° or more, 58° or more, or 60° or more. When the contact angle between the ink composition and the nozzle-forming surface is within the range above, droplets of the ink composition are unlikely to remain on the nozzle-forming surface during performing the wiping cleaning mechanism. Accordingly, chemical damage on the nozzle-forming surface due to the reaction of the crosslinkable component in the ink droplets with the nozzle-forming surface can be reduced, and the liquid repellent durability and the discharge stability can be further improved. Incidentally, the term "contact angle" in the present disclosure refers to a static contact angle. The contact angle in the present disclosure is measured in accordance with the sessile drop method of JIS R 3257 (Testing method of wettability of glass substrate) except that the glass substrate is changed to the nozzle-forming surface and that pure water is changed to the ink composition. Specifically, the sessile drop method can be performed using an automatic contact angle meter OCAH200 (product name, manufactured by Data Physics Corporation).

The surface tension of the ink composition may be 20 to 40 mN/m or 25 to 35 mN/m. When the surface tension is within the range above, the cleaning property tends to be further improved.

2. Maintenance Method

The maintenance method according to an embodiment of the present disclosure is a maintenance method in the above-described ink jet recording apparatus and includes a cleaning step of performing the pressurized cleaning by applying a pressure to the inside of the recording head and ejecting the ink composition from the nozzle and a wiping cleaning step of wiping the nozzle-forming surface with the absorption member containing cellulose. Consequently, even if a pigment ink having friction fastness is used, it is possible to perform cleaning of the nozzle-forming surface that has ensured the liquid repellent durability and the discharge stability.

The cleaning step and the wiping cleaning step in the maintenance method according to the present embodiment will now be described in detail.

2.1. Cleaning Step

An example of the cleaning step that performs pressurized cleaning in the maintenance method according to the present embodiment will be described in detail with reference to FIGS. 2 and 4.

During maintenance, as shown in FIG. 2, the recording head 6 is located at a position above the maintenance unit 55. The rotational speed in the forward direction of the liquid transfer pump 64 is accelerated to a certain pressurization rate. Incidentally, the pressurization rate is a rate faster than the normal rate during the printing operation. The maintenance unit 55 performs capping of the nozzle-forming surface 600, and the pressure control mechanism 68 pressurizes the tank 62 to a positive pressure. For more details, the pressurized cleaning is carried out as follows.

A three-way valve 86 is interposed in the common pressurization path 85 coupling between the pressure control mechanism 68 and the pressurized buffer tank 81. In this three-way valve 86, the port that is coupled to the pressurized buffer tank 81 is a common port. In the remaining ports, the port coupled to the three-way valve 682 of the pressure control mechanism 68 is normally open, whereas the port communicating with the atmosphere is normally closed. During the pressurized cleaning, the three-way valve 86 is maintained in the normal state to supply a positive pressure to the three-way valve 682 of the pressure control mechanism 68 from the pressurized buffer tank 81.

In the three-way valve 682 of the pressure control mechanism 68, the port coupled to the tank 62 is a common port. In the remaining ports, the atmosphere opening port communicating with the atmosphere is normally open, and the port coupled to the three-way valve 86 is normally closed. During the pressurized cleaning, the atmosphere opening port is closed, and the port coupled to the three-way valve 682 of the pressure control mechanism 68 is opened to apply a pressure to the tank 62 by the positive pressure in the pressurized buffer tank 81.

When a pressures is thus applied to the tank 62 by the positive pressure in the pressurized buffer tank 81, the pressure of the pressurized buffer tank 81 is decreased. Here, if the pressure is decreased to a certain value or less, it is difficult to continue the pressurized cleaning. Accordingly, in the present embodiment, when the pressure sensor 84 detects a decrease in the pressure, the pressurizing pump 8 is operated. Subsequently, the atmosphere opening port on the positive pressure side of the three-way valve 83 is then closed, and the switching port on the positive pressure side is opened to apply a pressure to the pressurized buffer tank 81. Incidentally, on this occasion, the air inlet of the pressurizing pump 8 is opened to the atmosphere. Then, when the pressure value in the pressurized buffer tank 81 is increased to a value higher than a certain value, the pressurizing pump 8 stops, and further the atmosphere opening port on the positive pressure side and the switching port on the positive pressure side are opened and closed, respectively.

Thus, the internal pressure of the pressurized buffer tank 81 is always maintained at a certain value or more, and a pressure is applied to the tank 62 by the positive pressure in the pressurized buffer tank 81. Consequently, a pressure is applied to the nozzle 601 from the tank 62 through the collection channel 65.

Subsequently, the capping is released to discharge the ink composition in the nozzle 601 to the maintenance unit 55. In addition, bubbles and so on in the nozzle 601 are ejected from the nozzle 601 accompanied by the ink composition discharged from the nozzle 601.

Following this, the wiping cleaning step described later is carried out against the nozzle-forming surface 600. Consequently, the ink composition discharged from the nozzle 601 and adhered to the nozzle-forming surface 600 is wiped away. Subsequently, the rotational speed (circulation rate) of the liquid transfer pump 64 is decreased to a usual speed, flushing is carried out, and all of the nozzles 601 are filled with an ink. The flushing is thus accomplished to end the pressurized cleaning.

2.2. Wiping Cleaning Step

In the wiping cleaning step of the maintenance method according to the present embodiment, the nozzle-forming surface 600 of the recording head 6 is wiped with an absorption member 701 containing cellulose.

In more detail, in the wiping cleaning step, the absorption member 701 containing cellulose is pressed against the nozzle-forming surface 600 of the recording head 6 with a pressing member (not shown) included in the driving mechanism 702 to apply a pressing load to the nozzle-forming surface 600 and wipe it. Incidentally, while discharging the ink composition to the recording medium P, the absorption member 701 impregnated with the impregnation liquid containing an organic solvent is on standby, and the wiping cleaning step is performed after the accomplishment of the discharge of the ink composition.

Incidentally, in the maintenance method according to the present embodiment, the wiping cleaning step for wiping the nozzle-forming surface 600 with the absorption member 701 containing cellulose may be performed before and after the pressurized cleaning step. Consequently, it is possible to remove the ink composition adhered to the nozzle-forming surface 600 during the pressurized cleaning step or during the discharge of the ink composition to a recording medium P.

3. Example

The present disclosure will now be further specifically described by examples, but is not limited to these examples. Hereinafter, "%" is based on mass unless otherwise specified.

3.1. Preparation of Ink Composition

Each ink composition was obtained by mixing each component at the content shown in Tables 1 and 2 below, stirring them at room temperature for 2 hours, and then filtering the mixture through a membrane filter with a pore diameter of 5 μm. Incidentally, the unit of the content in each ink composition shown in Tables 1 and 2 below is mass %, and deionized water was added such that the total mass of the composition is 100 mass %. In Tables 1 and 2 below, the content of a pigment and the content of a resin are each expressed in terms of the solid content.

The pigment that is used in the preparation of an ink composition was prepared as a pigment dispersion in advance by mixing with deionized water together with a water-soluble styrene-acrylic resin as a pigment dispersant (not shown in Tables) at a mass ratio of 2:1 (pigment: pigment dispersant) and sufficiently stirring them. This pigment dispersion was used for preparation of the ink composition.

TABLE 1

|  |  |  |  | Example 1 | Example 2 | Example 3 | Example 4 | Example 5 | Example 6 | Example 7 | Example 8 |
|---|---|---|---|---|---|---|---|---|---|---|---|
| Ink composition | Pigment | Carbon Black solid content concentration |  | 5.0 | 5.0 | 5.0 | 5.0 | 5.0 | 5.0 | 5.0 | 5.0 |
|  | Resin | UW-1501F solid content concentration, crosslinkable urethane resin | Tg −20° C. | 7.0 | 4.0 | — | 7.0 | 7.0 | 7.0 | 7.0 | 7.0 |
|  |  | Takelac W-6061 solid content concentration, non-crosslinkable urethane resin | Tg 25° C. | — | — | 7.0 | — | — | — | — | — |
|  |  | Movinyl 6960 solid content concentration, non-crosslinkable acrylic resin | Tg −20° C. |  |  |  |  |  |  |  |  |

TABLE 1-continued

|  |  |  | Example 1 | Example 2 | Example 3 | Example 4 | Example 5 | Example 6 | Example 7 | Example 8 |
|---|---|---|---|---|---|---|---|---|---|---|
|  |  | Crosslinking agent SU-268A |  |  |  | 1.0 |  |  |  |  |
|  |  | Glycerin | 10.0 | 10.0 | 10.0 | 10.0 | 10.0 | 10.0 | 10.0 | 10.0 |
|  |  | Triethylene glycol | 5.0 | 5.0 | 5.0 | 5.0 | 5.0 | 5.0 | 5.0 | 5.0 |
|  |  | KOH | 0.1 | 0.1 | 0.1 | 0.1 | 0.1 | 0.1 | 0.1 | 0.1 |
|  |  | Surfactant (E1010) | 0.3 | 0.3 | 0.3 | 0.5 | 0.15 | 0.1 |  | 0.3 |
|  |  | Surfactant (BYK348) | — | — | — | — | — | 0.1 | 0.2 | — |
|  |  | Deionized water | Balance | Balance | Balance | Balance | Balance | Balance | Balance | Balance |
| Evaluation condition | Ink condition | Surface tension (mN/m) | 32.1 | 32.1 | 32.8 | 31.1 | 34.4 | 32 | 30.3 | 32.1 |
|  | Nozzle condition | Nozzle contact angle (°) | 60 | 60 | 60 | 57 | 63 | 55 | 50 | 60 |
|  | CL condition | Cleaning system | Pressurization | Pressurization | Pressurization | Pressurization | Pressurization | Pressurization | Pressurization | Pressurization |
|  |  | Pressurized CL sub-tank pressure (kPa) | 36 kPa | 36 kPa | 36 kPa | 36 kPa | 36 kPa | 36 kPa | 36 kPa | 40 kPa |
|  |  | Wiping speed (inch/sec) | 0.25 | 0.25 | 0.25 | 0.25 | 0.25 | 0.25 | 0.25 | 0.25 |
|  | Cloth wiper condition | Bemliese (derived from cellulose) | ● | ● | ● | ● | ● | ● | ● | ● |
|  |  | Trecy (derived from chemical fiber) | — | — | — | — | — | — | — | — |
| Evaluation result | Evaluation item | Nozzle durability | A | S | A | B | S | B | B | B |
|  |  | Discharge stability | A | A | A | S | B | S | S | A |
|  |  | Friction fastness | A | B | A | A | A | A | A | A |

|  |  |  | Example 9 | Example 10 | Comparative Example 1 | Comparative Example 2 | Comparative Example 3 | Comparative Example 4 | Comparative Example 5 |
|---|---|---|---|---|---|---|---|---|---|
| Ink composition | Pigment | Carbon Black solid content concentration | 5.0 | 5.0 | 5.0 | 5.0 | 5.0 | 5.0 | 5.0 |
|  | Resin | UW-1501F solid content concentration, crosslinkable urethane resin (Tg −20° C.) | 7.0 | 7.0 | — | — | 7.0 | 7.0 | 7.0 |
|  |  | Takelac W-6061 solid content concentration, non-crosslinkable urethane resin (Tg 25° C.) | — | — | 7.0 | — | — | — | — |
|  |  | Movinyl 6960 solid content concentration, non-crosslinkable acrylic resin (Tg −20° C.) |  |  |  | 7.0 |  |  |  |
|  | Crosslinking agent | SU-268A |  |  |  |  |  |  |  |
|  |  | Glycerin | 10.0 | 10.0 | 10.0 | 10.0 | 10.0 | 10.0 | 10.0 |
|  |  | Triethylene glycol | 5.0 | 5.0 | 5.0 | 5.0 | 5.0 | 5.0 | 5.0 |
|  |  | KOH | 0.1 | 0.1 | 0.1 | 0.1 | 0.1 | 0.1 | 0.1 |
|  |  | Surfactant (E1010) | 0.3 | 0.3 | 0.3 | 0.3 | 0.3 | — | 0.3 |
|  |  | Surfactant (BYK348) | — | — | — | — | — | 0.4 | — |
|  |  | Deionized water | Balance | Balance | Balance | Balance | Balance | Balance | Balance |
| Evaluation condition | Ink condition | Surface tension (mN/m) | 32.1 | 32.1 | 32.8 | 32.5 | 32.1 | 28.1 | 32.1 |
|  | Nozzle condition | Nozzle contact angle (°) | 60 | 60 | 60 | 60 | 60 | 48 | 60 |
|  | CL condition | Cleaning system | Pressurization | Pressurization | Pressurization | Pressurization | Aspiration | Pressurization | Pressurization |
|  |  | Pressurized CL sub-tank pressure (kPa) | 36 kPa | 36 kPa | 36 kPa | 36 kPa |  | 36 kPa | 36 kPa |
|  |  | Wiping speed (inch/sec) | 0.2 | 1.5 | 0.25 | 0.25 | 0.25 | 0.25 |  |
|  | Cloth wiper condition | Bemliese (derived from cellulose) | ● | ● | ● | ● | ● | ● | — |
|  |  | Trecy (derived from chemical fiber) | — | — | — | — | — | — | ● |
| Evaluation result | Evaluation item | Nozzle durability | B | B | S | S | C | C | C |
|  |  | Discharge stability | A | A | A | A | A | A | A |
|  |  | Friction fastness | A | A | C | C | A | A | A |

The explanation is supplemented for each component and each term shown in Tables 1 and 2 above.

Pigment

Carbon Black: trade name "MA 100", manufactured by Mitsubishi Chemical Corporation Resin UW-1501F: manufactured by Ube Industries, Ltd., trade name "Eternacoll UW-1501F", crosslinkable urethane resin, Tg=−20° C.

Takelac W-6061: trade name of manufactured by Mitsui Chemicals & SKC Polyurethanes, Inc., non-crosslinkable urethane resin, Tg=25° C.

Movinyl 6960: trade name of manufactured by The Nippon Synthetic Chemical Industry Co., Ltd., non-crosslinkable acrylic resin, Tg=−20° C.

Crosslinking Agent

SU-268A: trade name of manufactured by Meisei Chemical Works, Ltd., an isocyanate having an isocyanate group protected by a blocking agent Surfactant Olfine E1010: trade name of manufactured by Nissin Chemical Industry Co., Ltd., acetylene glycol type BYK348: trade name of manufactured by BYK Japan K.K., silicone type In Tables 1 and 2 above, the "crosslinkable urethane resin" means a urethane resin having a crosslinkable group as a crosslinkable component. The "non-crosslinkable urethane resin" and the "non-crosslinkable acrylic resin" mean respectively a urethane resin and an acrylic resin that are not crosslinkable components. That is, the "non-crosslinkable urethane resin" and the "non-crosslinkable acrylic resin" mean that they are not compounds capable of forming a crosslinked structure by reacting with a reactive group, such as a hydroxyl group.

In Tables 1 and 2 above, the "nozzle contact angle" means the contact angle of an ink composition on a nozzle-forming surface. That is, the "nozzle contact angle" means the angle formed by an ink composition and a nozzle-forming surface at a position where the ink composition is in contact with the nozzle-forming surface.

In Tables 1 and 2 above, the "pressurization" means that pressurized cleaning is performed, and the "aspiration" means that reduced pressure cleaning is performed. The "pressurized CL sub-tank pressure" means the pressure in a tank storing an ink composition during the implementation of the pressurized cleaning. The "wiping speed" means the speed when at least one of the absorption member and the recording head is moved relatively with respect to the other.

In Tables 1 and 2 above, the "cloth wiper condition" shows the fiber material from which the absorption member of the wiping cleaning mechanism is formed. The fiber material used is indicated with "●" in the tables.

Bemliese: trade name of Asahi Kasei Corporation, non-woven fabric made of cellulose Trecy: trade name of Toray Industries, Inc., cloth made of polyester or polyester and nylon

3.1.1. Surface Tension

The surface tensions shown in Tables 1 and 2 above were measured by a Wilhelmy method at a liquid temperature of 25° C. using a surface tensiometer (such as a surface tensiometer CBVP-Z, manufactured by Kyowa Interface Science Co., Ltd.).

3.1.2. Contact Angle

The contact angles shown in Tables 1 and 2 above are contact angles of the ink compositions obtained above on a nozzle-forming surface measured with a portable contact angle meter PCA-1 (manufactured by Kyowa Interface Science Co., Ltd.) at 25° C. The nozzle-forming surface used for measuring the contact angle was a silicon nozzle plate provided with a liquid repellent film made of monocrystal silicon. A film of silicon oxide ($SiO_2$ film) was formed on the surface of the plate on the ink discharge side through a chemical vapor deposition (CVD) method by introducing $SiCl_4$ and water vapor into a CVD reactor. The thickness of the $SiO_2$ film was 50 nm. Oxygen plasma treatment was further performed, and chemical vapor deposition (CVD) using $C_8F_{17}C_2H_4SiCl_3$ was then performed to form a liquid repellent film on the $SiO_2$ film to obtain a silicon nozzle plate provided with a liquid repellent film.

3.2. Evaluation Method

3.2.1. Evaluation of Nozzle Durability

As the ink jet recording apparatus, a printer (trade name "SC-F2000") manufactured by SEIKO EPSON CORPORATION modified so as to have a cleaning mechanism of applying a pressure to the inside of the tank storing an ink composition and performing pressurized cleaning and a wiping cleaning mechanism of performing wiping with an absorption member derived from cellulose (modified apparatus of trade name "SC-F2000") was used. In Comparative Example 3, a printer modified so as to have a reduced pressure (aspiration) cleaning mechanism instead of the pressurized cleaning mechanism was used. Incidentally, in Comparative Example 5, a printer modified so as to have a wiping cleaning mechanism of performing wiping with an absorption member derived from chemical fibers instead of the absorption member derived from cellulose was used.

The cartridge of the modified SC-F2000 was filled with each ink composition shown in Tables 1 and 2 above. Subsequently, the printing environment was adjusted to 35° C. and 20% R.H., and a nozzle check pattern was printed using the above-described ink jet recording apparatus. Subsequently, under the evaluation conditions shown in Tables 1 and 2 above, a cycle of performing the pressurized cleaning operation and then the wiping cleaning operation was carried out 5000 times with intervals of 1 minute. Subsequently, the nozzle check pattern was printed again, and the amount of misalignment of the dot that caused the highest landing position misalignment from the initial landing position of the ink after the cycle operation was measured. The amount of misalignment was measured using SmartScope ZIP250 (manufactured by OGP) by setting the initial dot as 0, measuring the position of each dot, and calculating the amount of misalignment of the dot position after the cycle operation from the initial position in the Y-axis direction (the medium feeding direction). The distance between the medium and the head A was 1.2 mm (platen gap). The evaluation criteria are as follows.

Evaluation Criteria

S: the landing position misalignment is 1 μm or less;
A: the landing position misalignment is more than 1 μm and 5 μm or less;
B: the landing position misalignment is more than 5 μm and 10 μm or less; and
C: the landing position misalignment is more than 10 μm.

3.2.2. Evaluation of Discharge Stability

Printing using each ink composition shown in Tables 1 and 2 above was continuously performed for 1 hour with SC-F2000 under the condition of a cloth surface temperature of 25° C. (ordinary temperature). After the completion of the printing, discharge abnormality (non-discharging) in 1 nozzle line (360 nozzles) was examined. Incidentally, all nozzles were in the normal state when the recording was started. The evaluation criteria are as follows.

Evaluation Criteria

S: the number of nozzles of abnormal discharge is 0;
A: the number of nozzles of abnormal discharge is 1 or 2;
B: the number of nozzles of abnormal discharge is 3 to 5; and
C: the number of nozzles of abnormal discharge is 6 or more.

3.2.3. Evaluation of Friction Fastness

Each ink composition prepared above was attached to cotton cloth by an ink jet method using an ink jet printer (trade name "PXG930", manufactured by SEIKO EPSON CORPORATION). The recording conditions were a recording resolution of 1440×720 dpi, a recording range of A4 size, and overlapped four layers of a solid pattern image. Thus, ink jet printing was performed. Here, the "solid pattern image" means an image of dots recorded for all pixels, each pixel being the minimum recording unit region defined by the recording dissolution.

Subsequently, heating treatment was performed with a heat press machine at 165° C. for 5 minutes to fix the ink composition to a recording medium. Thus, each printed matter in which an image was formed (an ink was printed) on a recording medium was produced.

The printed matter of each example was subjected to a color fastness test for friction according to the method specified in the ISO-105 X12 using an I-type tester (clock meter). Dry friction was tested according to the drying test specified in the ISO-105 X12 and was evaluated using a contamination gray scale. The evaluation criteria are as follows.

Evaluation Criteria

A: the friction fastness is 4th grade or higher;
B: the friction fastness is 2nd grade or higher and lower than 4th grade; and
C: the friction fastness is lower than 2nd grade.

3.3. Evaluation Result

The results of evaluation tests are shown in Tables 1 and 2 above.

The evaluation results above demonstrate that in Examples 1 to 10, the recorded matter has excellent friction fastness by that the ink composition contains a crosslinkable component and that even if such an ink composition is used, good liquid repellent durability (nozzle durability) can be obtained by that the contact angle of the ink composition on the nozzle-forming surface is set to a certain level or more and the ink jet recording apparatus includes a wiping cleaning mechanism for wiping by an absorption member containing cellulose and a pressurized cleaning mechanism. Thus, both the excellent friction fastness and the good liquid repellent durability can be achieved.

In contrast, in Comparative Examples 1 and 2 using an ink composition not containing a crosslinkable component, the results were that the recorded matter was inferior in friction fastness. In Comparative Examples 3 to 5, the results were that when an ink composition containing a crosslinkable component was used, the liquid repellent durability (nozzle durability) was inferior when the contact angle of the ink composition on the nozzle-forming surface was lower than a certain level or when an ink jet recording apparatus not having a wiping cleaning mechanism of wiping an absorption member containing cellulose and a pressurized cleaning mechanism was used.

The followings are derived from the above-described embodiments.

An aspect of the ink jet recording apparatus includes:
a recording head including a nozzle for discharging an ink composition and a nozzle-forming surface having a discharge opening of the nozzle;
a cleaning mechanism performing cleaning operation by ejecting the ink composition from the nozzle; and
a wiping cleaning mechanism of wiping the nozzle-forming surface with an absorption member containing cellulose, wherein
the ink composition contains a pigment, a crosslinkable component, a surfactant, and water;
the ink composition has a contact angle of 500 or more on the nozzle-forming surface; and
the cleaning mechanism performs pressurized cleaning by applying a pressure to the inside of the recording head.

In one aspect of the ink jet recording apparatus, the surfactant may be an acetylene glycol-based surfactant.

In any of the above-described aspects of the ink jet recording apparatus,
the applied pressure in the pressurized cleaning may be 38 kPa or less.

In any of the above-described aspects of the ink jet recording apparatus,
the nozzle-forming surface may include a fluorine compound bound through a hydrolyzable bond.

In any of the above-described aspects of the ink jet recording apparatus,
the ink composition may further contain a resin particle.

In any of the above-described aspects of the ink jet recording apparatus, the resin particle may be a urethane resin.

In any of the above-described aspects of the ink jet recording apparatus,
the resin particle may have a glass transition temperature (Tg) of −10° C. or less.

One aspect of the maintenance method is a maintenance method for the ink jet recording apparatus of the aspect above and includes:
a cleaning step of performing the pressurized cleaning by applying a pressure to the inside of the recording head and ejecting the ink composition from the nozzle; and
a wiping cleaning step of wiping the nozzle-forming surface with the absorption member containing cellulose.

The present disclosure is not limited to the above-described embodiments and can be variously modified. For example, the present disclosure includes a configuration substantially the same as the configuration described in the embodiment, for example, a configuration giving the same function, method, and result or a configuration having the same purpose and effect. In addition, the present disclosure includes a configuration having replacement of a non-essential part of the configuration described in the embodiment. Furthermore, the present disclosure includes a configuration that exhibits the same effect as that of the configuration described in the embodiment or a configuration that achieves the same purpose as that of the configuration described in the embodiment. In addition, the present disclosure includes a configuration in which a known technique is added to the configuration described in the embodiment.

What is claimed is:

1. An ink jet recording apparatus comprising:
a recording head including a nozzle for discharging an ink composition stored in a tank, and a nozzle-forming surface having a discharge opening of the nozzle;
a cleaning mechanism including a pressurized buffer tank in communication with the tank, the cleaning mechanism being configured to perform a cleaning operation by ejecting the ink composition from the nozzle; and
a wiping cleaning mechanism of wiping the nozzle-forming surface with an absorption member containing cellulose, wherein
the ink composition contains a pigment, a resin particle, a crosslinking agent, a surfactant, and water;
the cross-linking agent is configured to react with a reactive group of the resin particle;
the ink composition has a contact angle of 50° or more on the nozzle-forming surface; and
the cleaning mechanism performs pressurized cleaning by applying a pressure to the inside of the recording head, the pressure being generated by the pressurized buffer tank.

2. The ink jet recording apparatus according to claim 1, wherein the surfactant is an acetylene glycol-based surfactant.

3. The ink jet recording apparatus according to claim 1, wherein an applied pressure in the pressurized cleaning is 38 kPa or less.

4. The ink jet recording apparatus according to claim 1, wherein the nozzle-forming surface includes a fluorine compound bound through a hydrolyzable bond.

5. The ink jet recording apparatus according to claim 1, wherein the resin particle is a urethane resin.

6. The ink jet recording apparatus according to claim 1, wherein the resin particle has a glass transition temperature (Tg) of $-10°$ C. or less.

7. A maintenance method for the ink jet recording apparatus according to claim 1, comprising:
a cleaning step of performing the pressurized cleaning by applying a pressure to the inside of the recording head and ejecting the ink composition from the nozzle; and
a wiping cleaning step of wiping the nozzle-forming surface with the absorption member containing cellulose.

* * * * *